(12) United States Patent
Grieshop et al.

(10) Patent No.: US 11,421,438 B2
(45) Date of Patent: Aug. 23, 2022

(54) TRANSPORTABLE SHELTER

(71) Applicant: Celina Tent, Inc., Celina, OH (US)

(72) Inventors: Jeffrey L. Grieshop, Celina, OH (US); Gabriel D. Lehman, Celina, OH (US); Thomas Lietz, Wapakoneta, OH (US); Kyle J. Timmerman, Ft. Recovery, OH (US); Alex Muhlenkamp, Coldwater, OH (US); Paul Kaverman, Geneva, IN (US); Allan Bruns, St. Henry, OH (US); Edward E. Eichler, Celina, OH (US); Dussel Vondenhuevel, Celina, OH (US); Herbert L. Grieshop, Celina, OH (US)

(73) Assignee: CELINA TENT, INC., Celina, OH (US)

( * ) Notice: Subject to any disclaimer, the term of this patent is extended or adjusted under 35 U.S.C. 154(b) by 0 days.

(21) Appl. No.: 17/024,990

(22) Filed: Sep. 18, 2020

(65) Prior Publication Data
US 2022/0090406 A1    Mar. 24, 2022

(51) Int. Cl.
| | | |
|---|---|---|
| *E04H 15/00* | (2006.01) | |
| *E04H 15/56* | (2006.01) | |
| *E04H 15/62* | (2006.01) | |
| *E04H 15/36* | (2006.01) | |
| *E04H 15/14* | (2006.01) | |
| *E04H 15/12* | (2006.01) | |

(52) U.S. Cl.
CPC .......... *E04H 15/008* (2013.01); *E04H 15/56* (2013.01); *E04H 15/62* (2013.01); *E04H 15/12* (2013.01); *E04H 15/14* (2013.01); *E04H 15/36* (2013.01)

(58) Field of Classification Search
CPC ...... E04H 15/008; E04H 15/36; E04H 15/644
See application file for complete search history.

(56) References Cited

U.S. PATENT DOCUMENTS

| | | | | |
|---|---|---|---|---|
| 2,567,697 | A * | 9/1951 | Craighead, Jr. ......... | E04H 15/04 135/90 |
| 2,797,696 | A * | 7/1957 | Fritsche .................. | E04H 15/52 135/136 |
| 3,165,110 | A * | 1/1965 | Brooks ................... | E04H 15/36 135/124 |
| 3,820,553 | A * | 6/1974 | Huddle .................... | E04H 15/52 135/130 |

(Continued)

*Primary Examiner* — Noah Chandler Hawk
(74) *Attorney, Agent, or Firm* — Calfee, Halter & Griswold LLP

(57) ABSTRACT

A transportable shelter includes a frame, an inner liner, and an outer liner. A plurality of interconnecting members of the frame are connected to create a fixed structural element, at least one end structural element, and a plurality of purlin portions. The purlin portions attach the fixed structural element to a first end structural element. The fixed structural element has a first inner track and a first outer track, and the first end structural element has a second inner track and a second outer track. The inner liner attaches to the first and second inner tracks, and the outer panel attaches to the first and second outer tracks. A dead-air space exists between the inner liner and the outer panel when the frame is assembled and the inner liner and the outer panel are connected to both the fixed structural element and the first end structural element.

29 Claims, 24 Drawing Sheets

(56) References Cited

U.S. PATENT DOCUMENTS

| | | | | |
|---|---|---|---|---|
| 4,036,244 A | * | 7/1977 | Huddle | E04H 15/18 |
| | | | | 52/63 |
| 4,593,710 A | * | 6/1986 | Stafford | E04B 1/3205 |
| | | | | 135/119 |
| 4,644,706 A | * | 2/1987 | Stafford | E04H 15/18 |
| | | | | 135/120.2 |
| 4,649,947 A | * | 3/1987 | Tury | E04H 15/18 |
| | | | | 135/117 |
| 5,269,106 A | * | 12/1993 | Stafford | E04B 7/022 |
| | | | | 135/122 |
| 8,534,305 B1 | * | 9/2013 | Woodall | E04H 15/12 |
| | | | | 135/96 |
| 2013/0104947 A1 | * | 5/2013 | Hotes | E04H 9/16 |
| | | | | 135/96 |

* cited by examiner

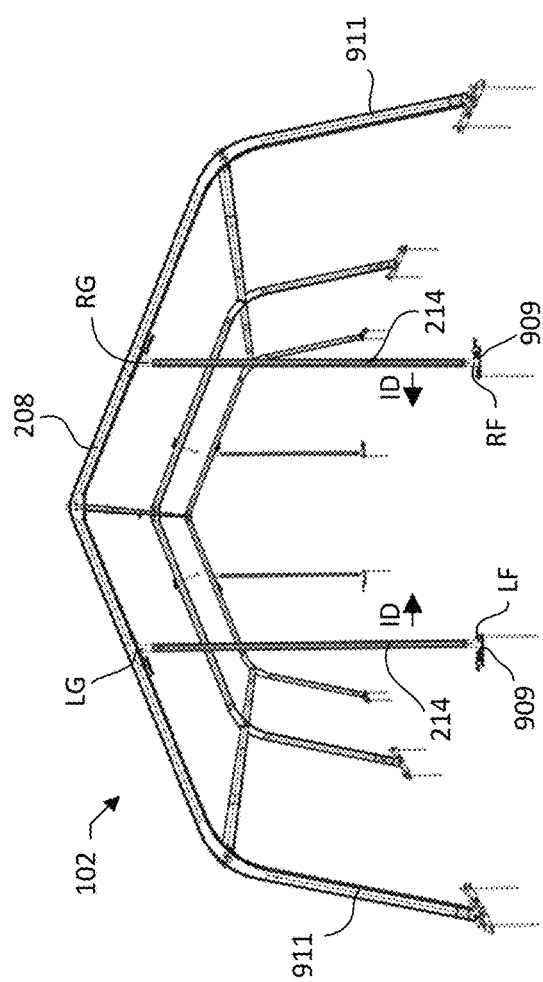
FIG. 9
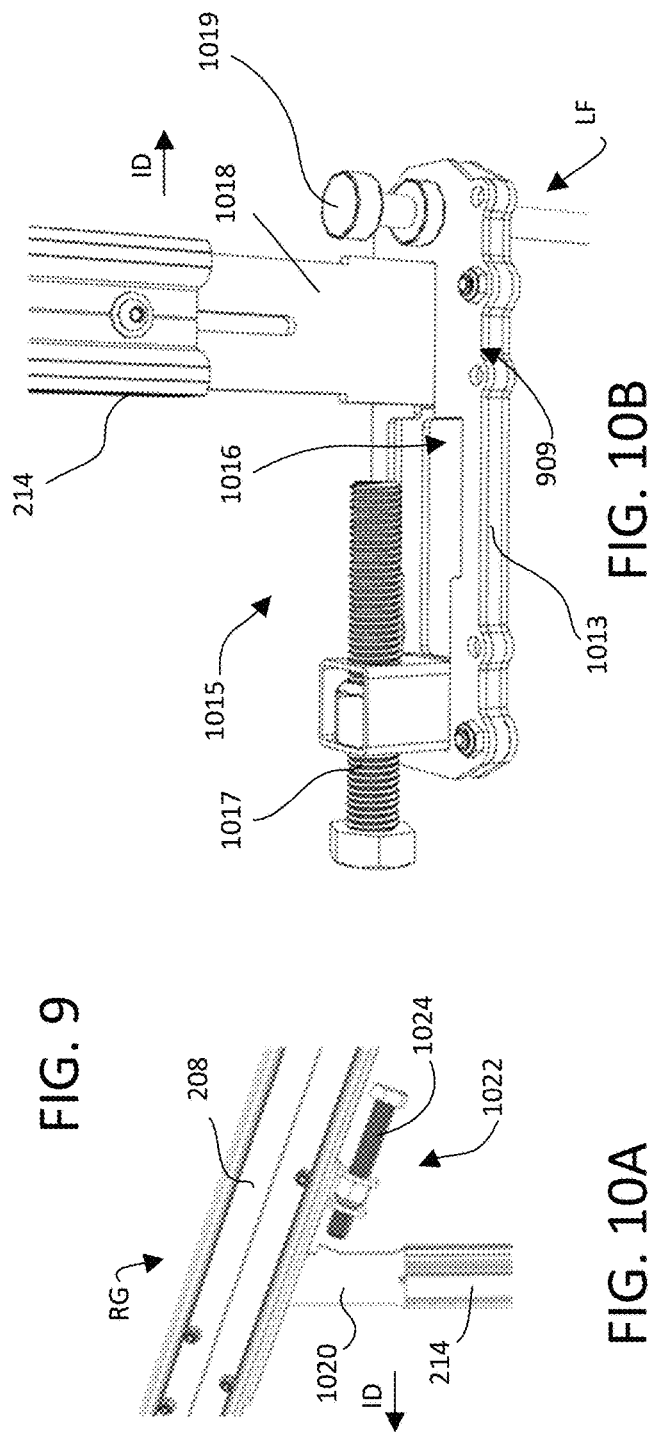
FIG. 10A
FIG. 10B

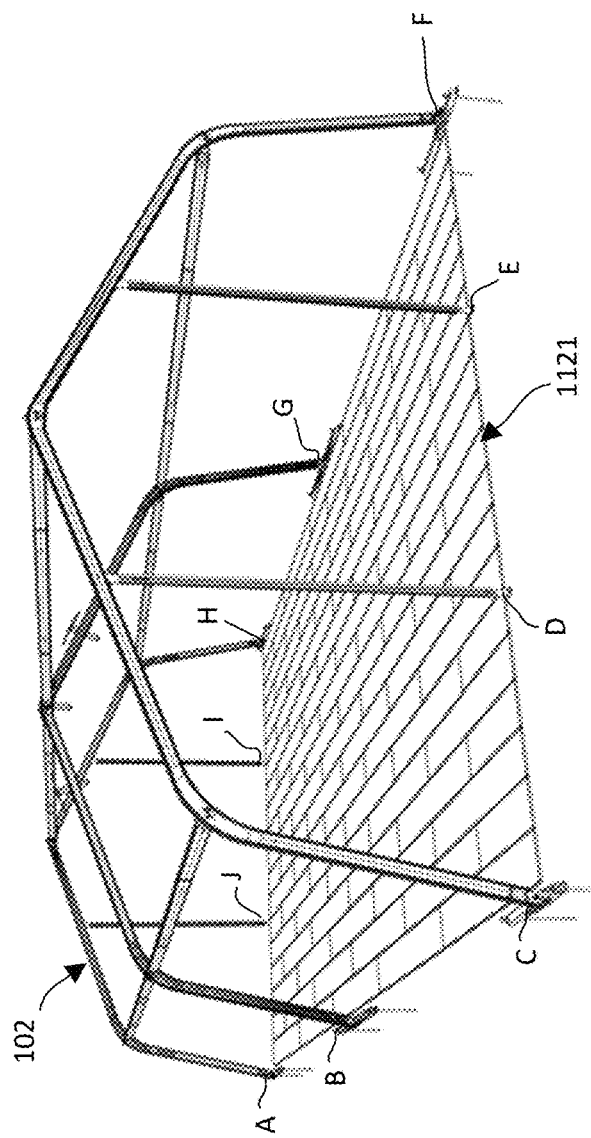
FIG. 11
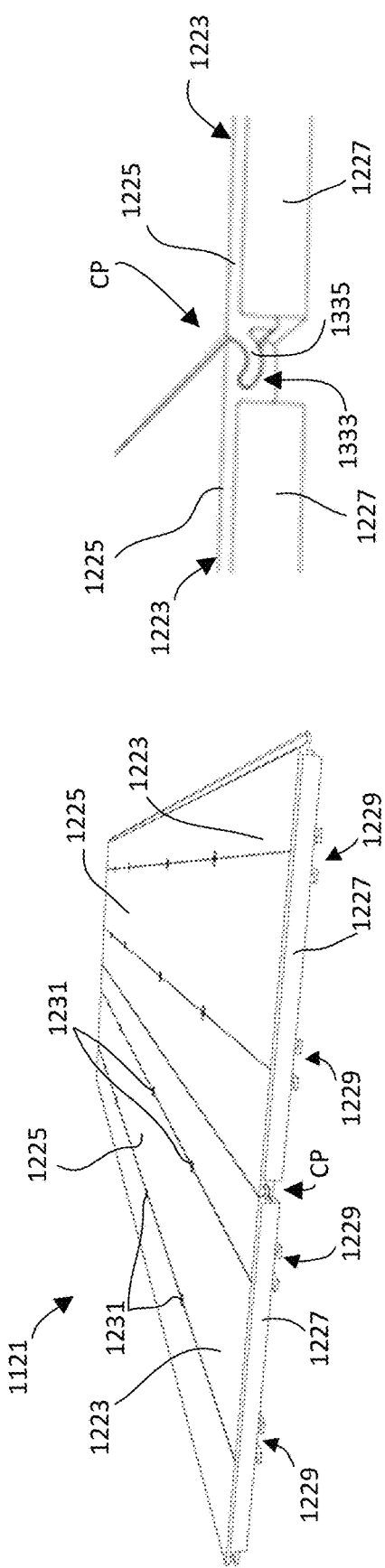
FIG. 13
FIG. 12

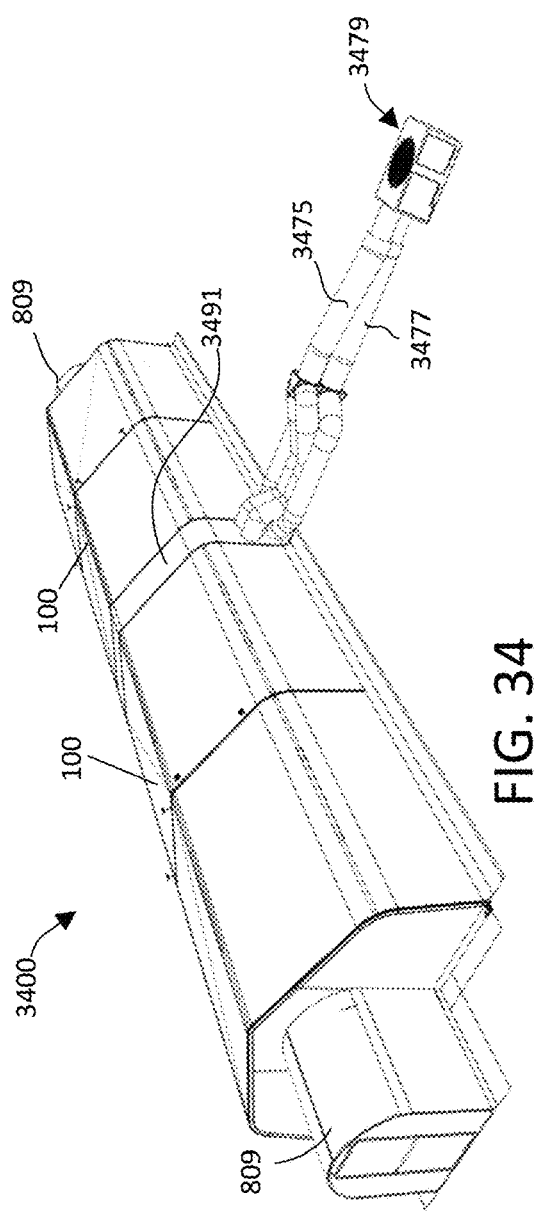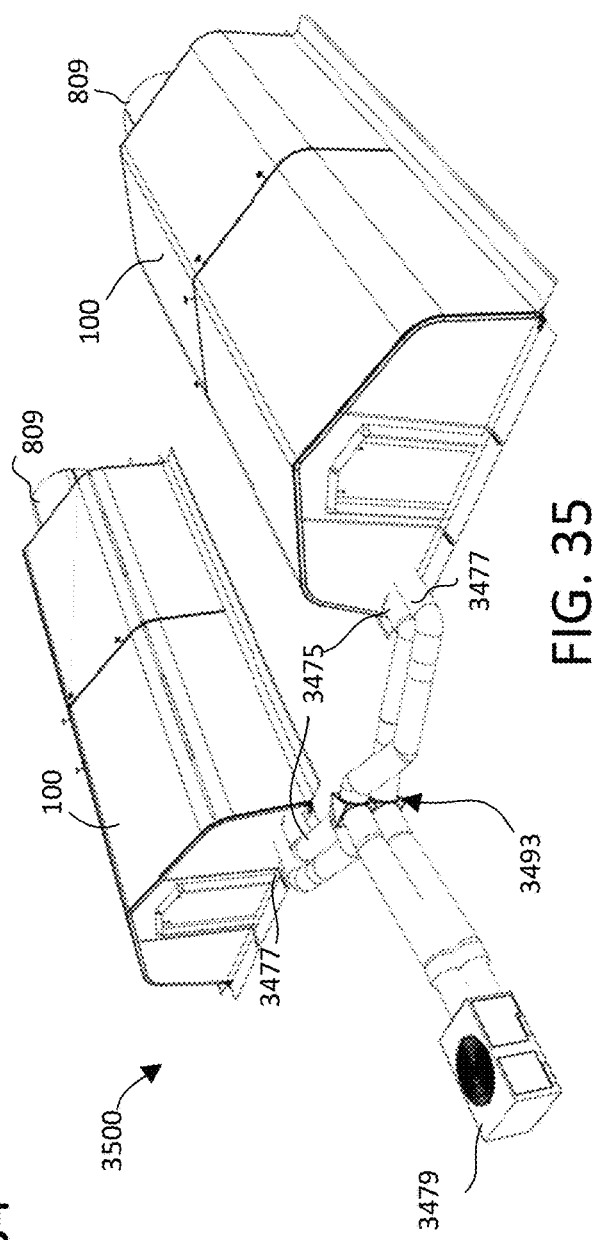

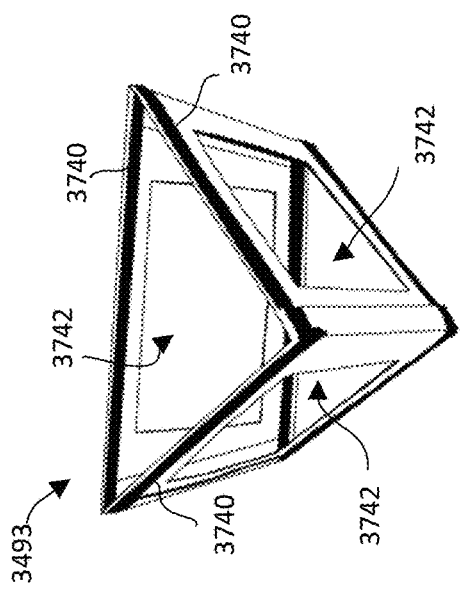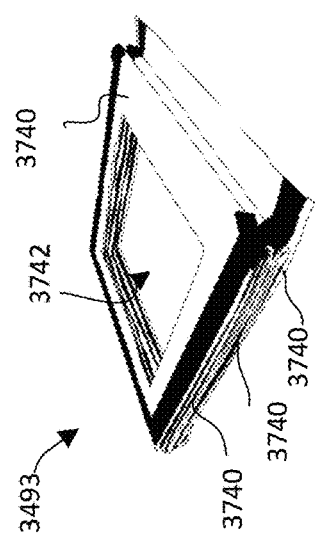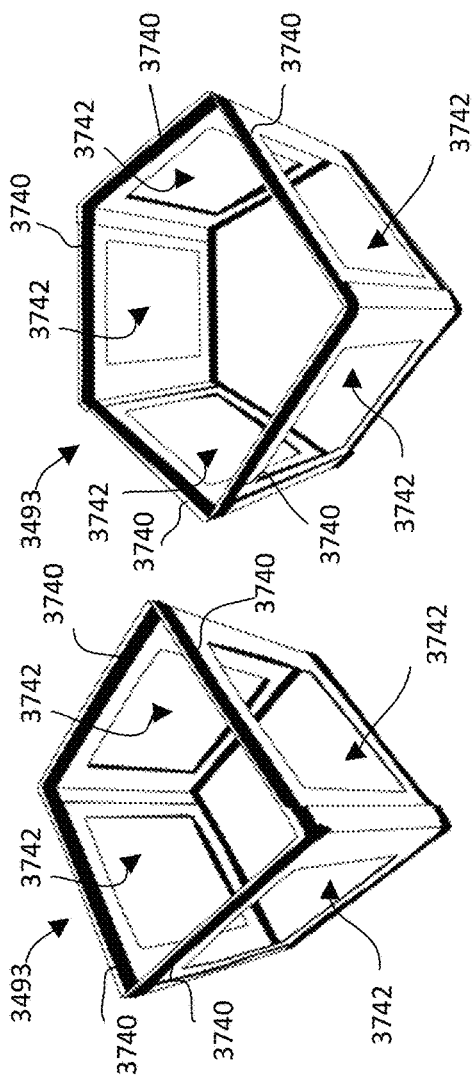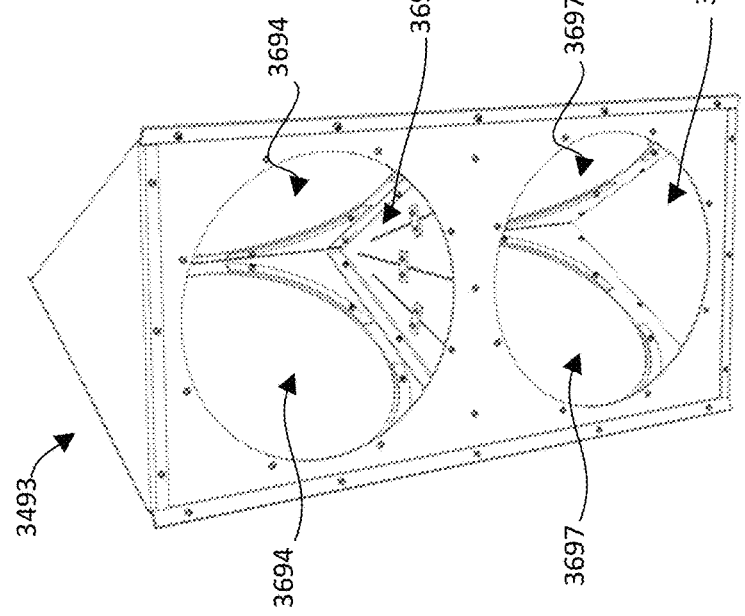

TRANSPORTABLE SHELTER

FIELD OF INVENTION

The present invention relates generally to a transportable shelter, and, more particularly, a transportable shelter used in military settings.

BACKGROUND

Transportable shelters (e.g., tensioned fabric buildings, tents, etc.) are used in various situations. For example, a person may use a tent to go camping. In another example, military personnel often use transportable shelters for training or when stationed in a foreign country. Standard transportable shelters include an inter-locking frame system that creates a hoop, Quonset hut, angular, or otherwise frame-based structure, and the frame-based structure is covered with a fabric to create side and end walls of the structure.

Military transportable shelters are typically setup in austere locations with limited access to power or adequate transportation methods. The components of the transportable shelter are typically transported to these locations by air or ground transportation. In addition, energy sources (e.g., fuel) and other supplies for providing heating and cooling to the transportable shelters must be delivered to these locations.

Transportable shelters may be used in contingency situations where there may be conflict, natural disasters, humanitarian relief, and or man-made events. Pre-positioned shelters and related equipment are crucial to assisting these efforts, and there are numerous warehouses and depots setup around the world to pre-stage and stock these materials for such events. Logistics management of inventoried equipment inventory and speed of transportation is extremely important to assist in these events.

Transportable shelters are often insulated using batt, high loft, and/or high pile insulation to prevent the thermal transfer through the walls of the shelter. The insulation prevents hot air from moving into the shelter when the shelter is utilized in hot weather conditions, and prevents cold air from moving into the shelter when the shelter is utilized in cold weather conditions.

With regards to military use, war and conflict related situations often requires that the coloring of the shelters and related equipment correspond to the local landscape of the location in which the shelters will be assembled. For example, if the shelters are being assembled in a woodland environment, the shelters may need to be a green color scheme, and, if the shelters are being assembled in a desert environment, the shelters may need to be a tan color scheme. The need for different color shelters typically means that multiple parts made of different colors (e.g., green and tan) must be stocked at the above-mentioned warehouses and depots so that a desired color shelter can be transported and assembled as needed. If the desired color scheme is not available at a nearby warehouse or depot, additional transportation costs (e.g., transportation by air) is typically required to transport the desired color materials to the shelter site.

SUMMARY

An exemplary embodiment of a transportable shelter includes a frame, an inner liner, and an outer liner. A plurality of interconnecting members of the frame are connected to create a fixed structural element, at least one end structural element, and a plurality of purlin portions. The purlin portions attach the fixed structural element to a first end structural element. The fixed structural element has a first inner track and a first outer track, and the first end structural element has a second inner track and a second outer track. The inner liner has liner connection elements for attaching to the first and second inner tracks, and the outer panel has panel connection elements for attaching to the first and second outer tracks. A dead-air space exists between the inner liner and the outer panel when the frame is assembled and the inner liner and the outer panel are connected to both the fixed structural element and the first end structural element.

Another exemplary embodiment of a transportable shelter includes a frame and an outer liner. The plurality of interconnecting members of the frame are connected to create a fixed structural element, at least one end structural element, and a plurality of purlin portions. The purlin portions attach the fixed structural element to a first end structural element. The fixed structural element has a first outer track, and the first end structural element has a second outer track. The outer panel has panel connection elements for attaching to the first and second outer tracks. The outer panel has a first side having a first color and a second side having a second color, and the panel connection elements can be attached to the first and second outer tracks such that the first side is facing an exterior of the transportable shelter of the second side is facing the exterior of the transportable shelter.

Another exemplary embodiment of a transportable shelter includes a frame, a first inner liner, a second inner liner, a first outer panel, a second outer panel, a plurality of first tensioning mechanisms, and a plurality of second tensioning mechanisms. A plurality of interconnecting members of the frame are connected to create a fixed structural element, a first end structural element, a second end structural element, and a plurality of purlin portions. The purlin portions attach the fixed structural element to the first and second end structural elements. The fixed structural element has first and second inner tracks and first and second outer tracks. The first end structural element has a third inner track and a third outer track, and the second end structural element has a fourth inner track and a fourth outer track. The first inner liner has first liner connection elements for attaching to the first inner track of the fixed structural element and the third inner track of the first end structural element, and the second inner liner has second liner connection elements for attaching to the second inner track of the fixed structural element and the fourth inner track of the second end structural element. The first outer panel has first panel connection elements for attaching to the first outer track of the fixed structural element and the third outer track of the first end structural element, and the second outer panel has second panel connection elements for attaching to the second outer track of the fixed structural element and the fourth outer track of the second end structural element. The first tensioning mechanisms are attached to the first end structural element and move the first end structural element relative to the fixed structural element to apply a tensioning force on the first inner liner and the first outer panel. The second tensioning mechanisms are attached to the second end structural element and move the second end structural element relative to the fixed structural element to apply a tensioning force on the second inner liner and the second outer panel. A first dead-air space is created between the first inner liner and the first outer panel when a tensioning force is applied to the first inner liner and the first outer panel, and a second dead-air space is created between the second inner liner and the second outer panel when a tensioning force is applied to the second inner liner and the second outer panel.

BRIEF DESCRIPTION OF THE DRAWINGS

FIG. 9 shows an exemplary connection between end wall beams and an end structural element of the frame of FIG. 2;

FIG. 10A shows an exemplary embodiment of a connection between the end wall beams and the frame shown in FIG. 9;

FIG. 10B shows an exemplary embodiment of a base member for the end wall beams of FIG. 9;

FIG. 11 shows a perspective view of an exemplary embodiment of a flooring assembly connected to the frame of FIG. 2;

FIG. 12 shows an exemplary embodiment of flooring panels for the flooring assembly of FIG. 11;

FIG. 13 shows an exemplary connection between the flooring panels shown in FIG. 12;

FIG. 34 shows an exemplary embodiment a transportable shelter assembly having two transportable shelters of FIG. 1 attached in an end-to-end configuration, where the transportable shelter assembly is attached to an environmental control unit;

FIG. 35 shows an exemplary embodiment a transportable shelter assembly having two transportable shelters of FIG. 1 attached in side-by-side configuration, where the transportable shelter assembly is attached to an environmental control unit;

FIG. 36 shows an exemplary embodiment of an air distribution block that can be used to connect the environmental control unit to the transportable shelter assemblies of FIGS. 34 and 35;

FIGS. 37A-37D show another exemplary embodiment of an air distribution block;

DETAILED DESCRIPTION

With the vast number of possible locations having varying environmental conditions where both civilian and military personnel require shelter, there exists a need for rapidly deploying, compact, easy to transport shelters designed to tolerate disparate temperatures and weather conditions. Transportable shelters used by the military must meet certain requirements. For example, the shelter must be designed to be transportable by a cargo plane. Accordingly, a transportable shelter that is capable of being stored and transported in a reduced amount of space is desired. In addition, transportable shelters used by the military need to be able to withstand weather conditions of areas in which the transportable shelters are being used. Therefore, a transportable shelter that can be customized to withstand any of a various number of weather conditions is desired.

The present application is directed to an energy efficient transportable shelter that is easy to assemble on-site. The shelter is a compact, easy-to-assembly, and lightweight shelter that optimizes energy efficiency by improving the shelter's thermal efficiency performance (e.g., conduction, convection, and radiation). In order to reduce weight and volume, the shelter utilizes the low thermal conductivity of dead-air space (i.e., an unventilated air space in which air does not circulate). Comparatively, typical shelter designs include batt, high loft, and/or high pile insulation that adds a tremendous amount of volume and weight to the shelter, which increases the transportation costs associated with the transportable shelter. The shelter may be configured to have reversible outer panels, which allows a user to easily change the external appearance (e.g., a tan color or a green color) based on the environment in which the shelter is being used (e.g., a desert environment or a wooded environment).

The general inventive concepts of the present application will now be described by referencing the following exemplary embodiments. The description with reference to the following exemplary embodiments is not intended to limit the scope of the claims in any way, and the terms used in the claims have their full ordinary meaning.

Figure 1:
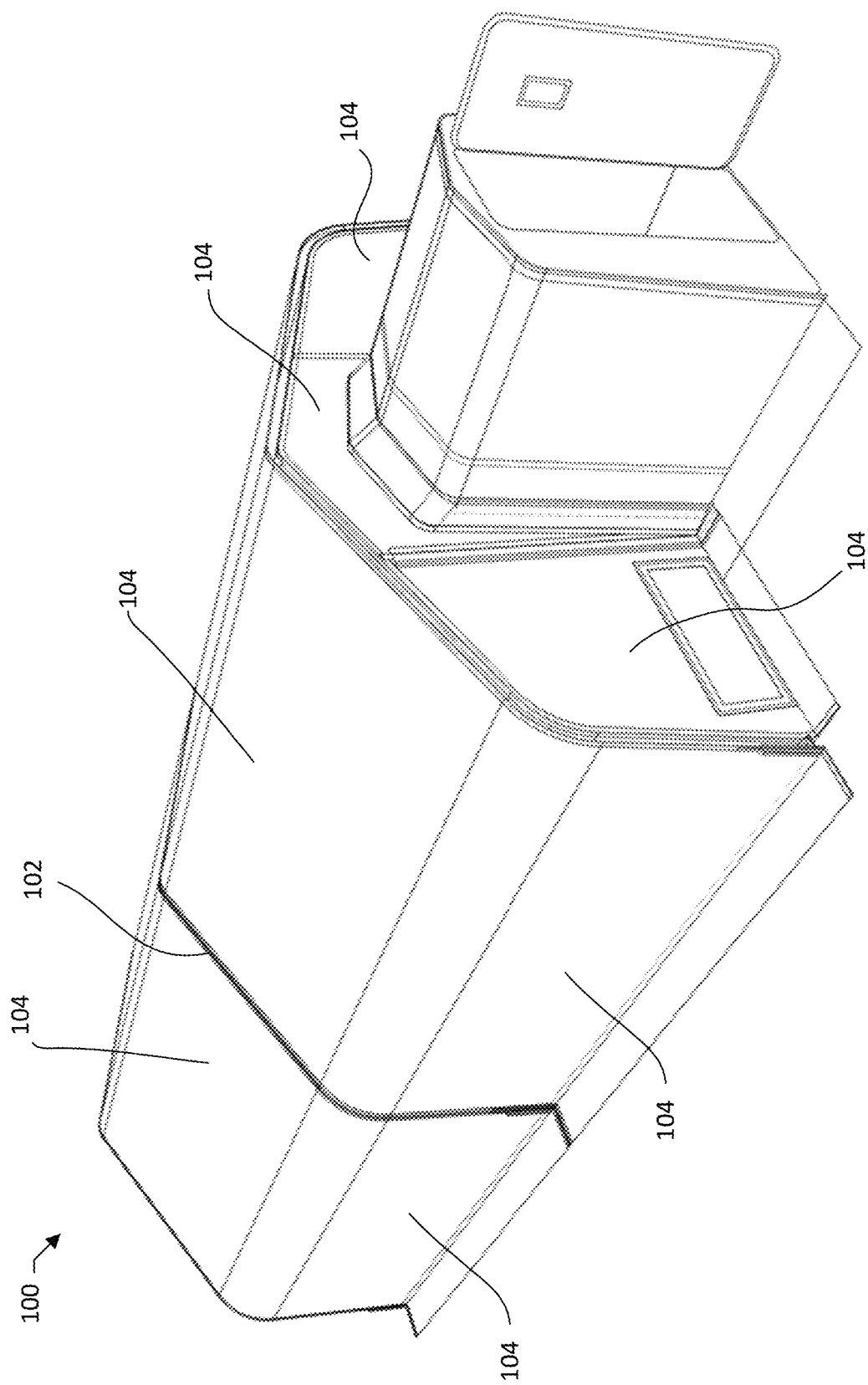
FIG. 1 shows a perspective view of an exemplary embodiment of a transportable shelter.

Referring to FIG. 1, an exemplary embodiment of a transportable shelter 100 includes a frame 102 and outer panels 104 connected to the frame 102. The outer panels 104 define an exterior of the transportable shelter 102 to prevent weather conditioners (e.g., snow, rain, wind, etc.) from moving into an interior of the transportable shelter. In certain embodiments, the panels 104 can include a film attached to a woven or knitted material. The woven or knitted material can be, for example, a polyester or nylon material. The film can be, for example, a PVC, polyethylene, polypropylene material. The panels 104 may, however, be made of any other suitable type of material. In some embodiments, the outer panels 104 are reversible. For example, a first side of the outer panel 104 can be a first color (e.g., tan) and a second side of the outer panel 104 can be a second color (e.g., green), and the attachment between the outer panels 104 and the frame 102 allow for the outer panels to easily be flipped over (e.g., rotated or reversed) such that a user can make the transportable shelter be either the first or second color. An exemplary attachment between the outer panels 104 and the frame 102 is described in the present application with reference to FIGS. 18 through 21.

The exterior facing portion of the frame 102 may have a black finish and be non-reflective. The black finish of the exterior of the frame is advantageous because it allows the exterior of the transportable shelter to meet military requirements when the outer panels are either tan or green. That is, military requirements typically require the exterior of the shelter to be tan, green, and/or black, and the black exterior frame meets these requirements when used in conjunction with either the tan outer panels or the green outer panels. The black finish of the exterior frame may include a coating formed by anodizing the aluminum frame. Alternatively, the black exterior may be formed by painting, powder coating, Chemical Agent Resistant Coatings (CARC), or etc. In other embodiments, the exterior of the frame 102 may be any other suitable color as desired by the end user.

In certain embodiments, the outer panels 104 can include protective membranes that act as chemical, biological, radioactive, nuclear, and/or explosive (CBRNE) barriers. In some embodiments, the outer panels 104 can include photovoltaic (PV) or solar panels that are configured to reduce dependence on power generation and fossil fuels, which is advantageous because power generation components and fossil fuels can provide a risk to transport and maintain in military settings or other areas of conflict. The outer panels 104 may include a hardened or semi-hardened surfaces to protect against small arms fire and shrapnel created from small explosions.

The transportable shelter 100 may include an inner liner (e.g., inner liner 2153 shown in FIG. 21) that connects to the frame to create a dead-air space that insulates the interior of the transportable shelter. The transportable shelter 100 may also include a floor liner (not shown) that attaches to the frame 102 and the inner liner to provide a further barrier between an exterior and interior of the shelter that allows for the interior of the shelter 100 to be air and water-tight. The floor liner may be made of a flexible material, such as, for example, PVC, polyethylene, or any other suitable material that is impervious to air and water. The flexible floor liner can be removably attached to an inner liner to form a secure seal by, for example, a hook and loop connection. The removable attachment between the inner liner and the floor liner allows the floor liner to be detached and replaced without de-installing or striking the shelter.

Figure 2:
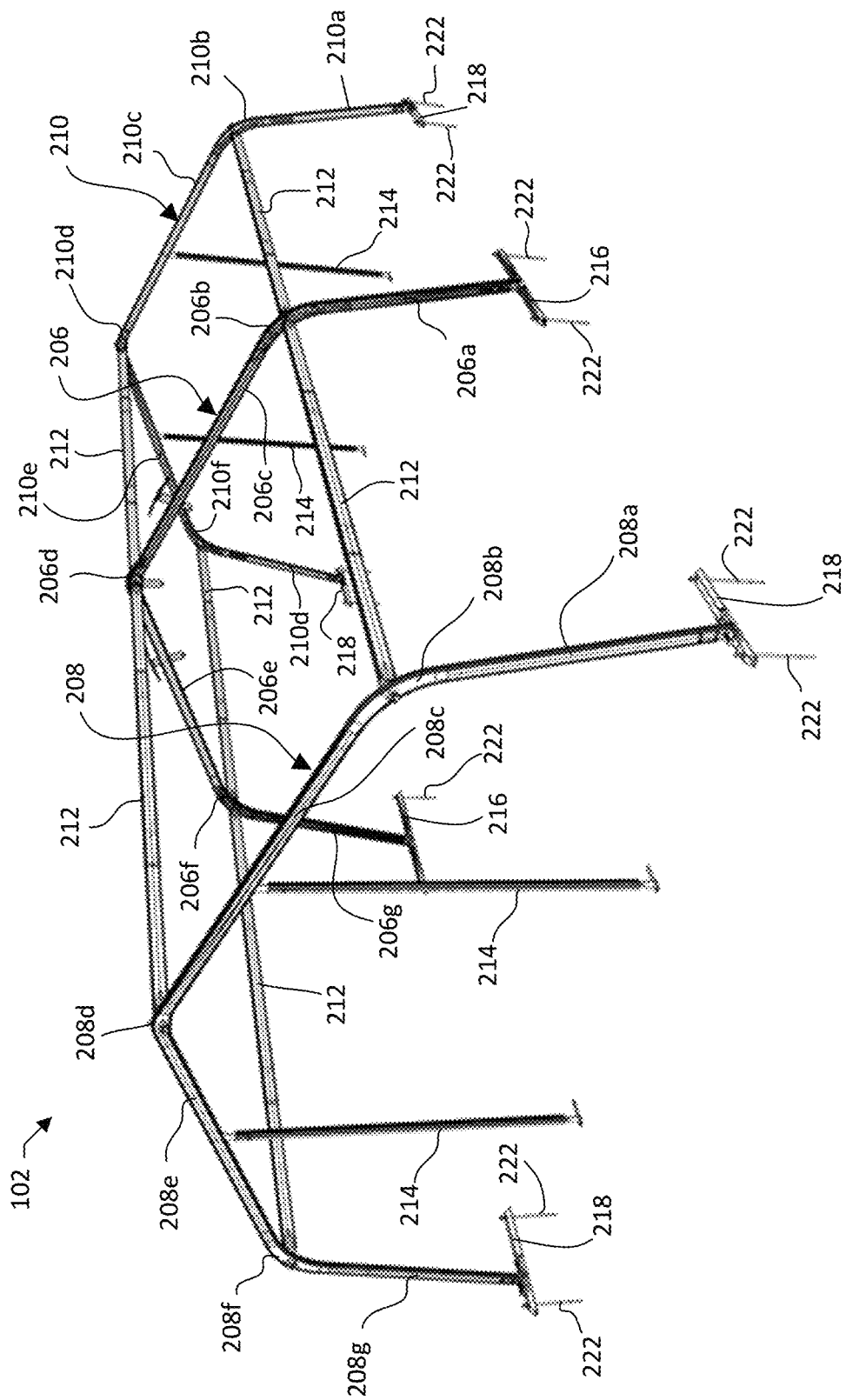
FIG. 2 shows a perspective view of an exemplary embodiment of a frame for the transportable shelter of FIG. 1.
Figure 3:
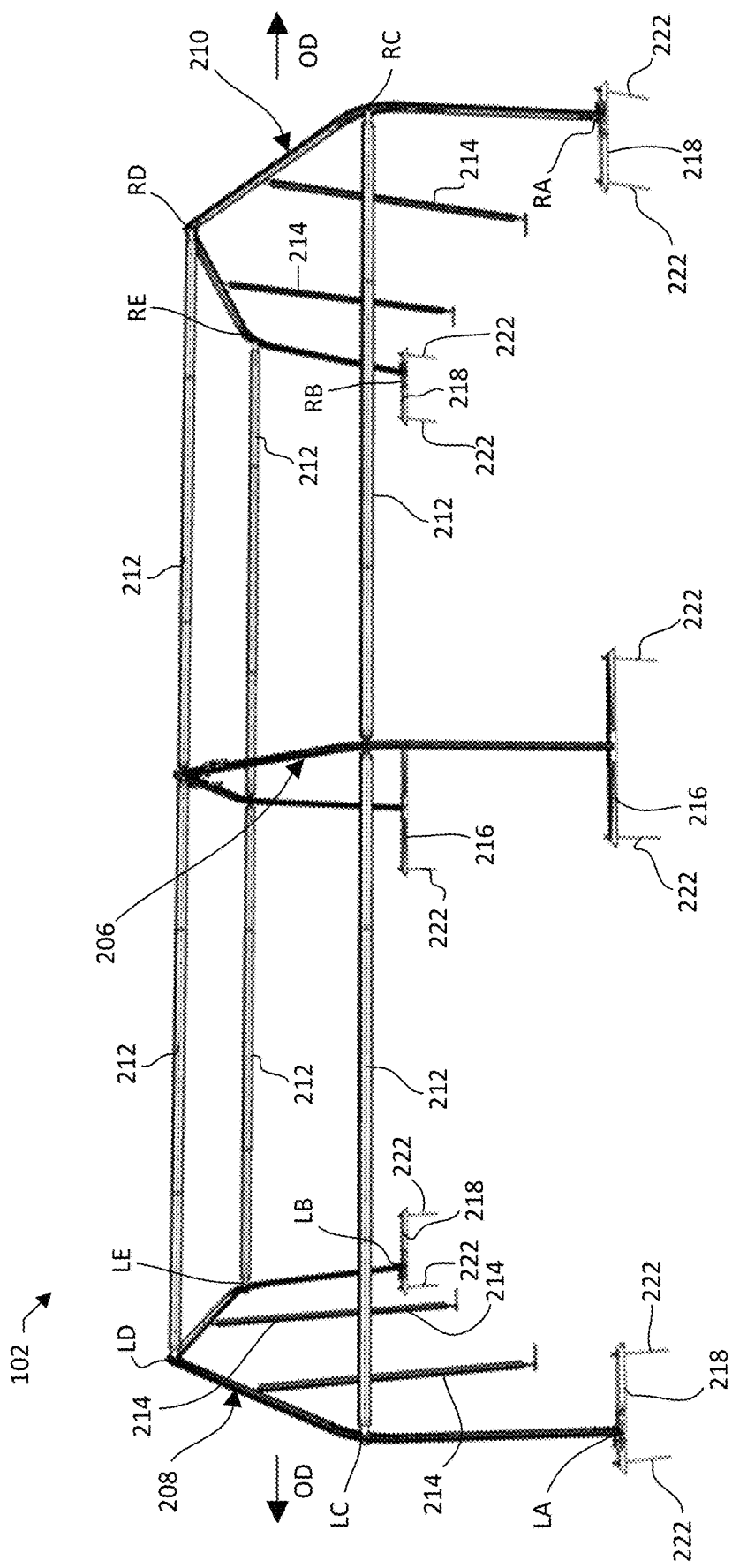
FIG. 3 shows a side view of the frame of FIG. 2.

Referring to FIGS. 2 and 3, in certain embodiments, the frame 102 includes a plurality of interconnecting members that are used to create a fixed structural element 206, a first end structural element 208, a second end structural element 210, one or more base members 216, 218, purlin portions 212, and end wall beams 214. The base members 216, 218 attach to a ground surface (e.g., by fastener 222) and provide support to the corresponding structural elements 206, 208, 210. The illustrated embodiment includes fixed base members 216 that provide support to the fixed structural element 206 and end base members 218 that provide support to the end structural elements 208, 210. In other embodiments, a single base member may provide support to one end of each of the structural elements 206, 208, 210, and another single base member may provide support to the other end of each of the structural elements 206, 208, 210. It should be understood that any suitable number of base members can be used to provide support to the structural elements 206, 208, 210 of the frame.

The purlin portions 212 may include one or more purlins that connect the end structural elements 208, 210 to the fixed structural element 206, and the end wall beams 214 attach to the end structural elements 208, 210 and engage a ground surface to provide for connection points for end panels (e.g., end panels 801a-801c shown in FIG. 8) of the transportable shelter 100, as well as provide additional support to the frame 102. In some embodiments, the end wall beams 214 are not included (or are removably connected to the structural element(s) 208, 210) such that the ends of the transportable shelter can be fully opened. The purlins 212 can be beams made of a metal material, such as, for example, extruded or cast aluminum, carbon or cast steel, etc. The purlins 212 can be connected to the structural elements by connection fittings, such as, for example, computer numerical control (CNC) machined metal (e.g., steel, aluminum, etc.) fittings. The connection fittings can be configured for a fastener-type connection (e.g., bolts, pins, etc.) between purlins 212 and the structural elements. The end wall beams 214 can be made of a metal material, such as, for example, extruded or cast aluminum, carbon or cast steel, etc. The end wall beams 214 can be connected to the end structural elements 208, 210 by connection fittings, such as, for example, CNC machined metal (e.g., steel, aluminum, etc.) fittings. The connection fittings can be configured for a fastener-type connection (e.g., bolts, pins, etc.) between end wall beams 214 and the structural elements.

Referring to FIG. 2, each of the fixed structural element 206 and the end structural elements 208, 210 may be constructed of a plurality of interconnecting members (e.g., interconnecting members 206a-206g, 208a-208g, 210a-210g) that are capable of being assembled on-site to create the structural elements. The interconnecting members can be beams made of a metal material, such as, for example, extruded or cast aluminum, carbon or cast steel, etc. The interconnecting member can be connected to each other by connection fittings, such as, for example, CNC machined metal (e.g., steel, aluminum, etc.) fittings. In some embodiments, one or more of the interconnecting members and/or one or more connections of the interconnecting members can take the form described in U.S. Patent Publication No. 2018/0245367 and/or U.S. Patent Publication No. 2019/0119945, which are incorporated herein by reference in their entireties. In the illustrated embodiment, the structural elements 206, 208, 210 are shown as having an arched shape, but it should be understood that the structural elements can have any other suitable shape, such as, for example, a Quonset shape, a swept side wall shape, a tapered side wall shape, a vertical side wall shape, or any other suitable type of shape.

In certain embodiments, the interconnecting members of the frame 102 that are used to create the fixed structural element, end structural elements 208, 210, purlin portions, and end wall beams 214 can be sized for easily transporting the interconnecting members to the site in which the interconnecting members are assembled to create the frame 102. For example, the interconnecting members of the frame 102 may have a longest length of about 150 inches or less, such as about, 120 inches or less, such as about 90 inches or less, such as about 60 inches or less. In certain embodiments, 50% or more of the interconnecting members of the frame 102 have a longest length of 90 inches or less, such as 75% of the interconnecting members of the frame 102 having a longest length of 90 inches or less, such as 90% of the interconnecting members of the frame 102 having a longest length of 90 inches or less, such as all of the interconnecting members of the frame 102 having a longest length of 90 inches or less.

Referring to FIG. 3, the end structural elements 208, 210 of the frame 102 are configured to move in an outward direction OD relative to the fixed structural element 206 after the frame 102 is assembled on-site. For example, the connection between the end structural elements 208, 210 and the corresponding base members 218 (at connection points LA, LB, RA, RB), and the connection between the end structural elements 208, 210 and the fixed structural element 206 (via the purlins 212 at connection points LC, LD, LE, RC, RD, RE), allows the end structural elements 208, 210 to be moved in the outward direction OD relative to the fixed structural elements 206. This movement of the end structural elements 208, 210 relative to the fixed structural element 206 creates a tensioning force on inner liners (e.g., inner liners 2153 shown in FIG. 21) and outer panels (e.g., outer panels 104 shown in FIGS. 1 and 21) of the transportable shelter 100. That is, as explained in more detail below, inner liners and outer panels of the transportable shelter 102 can be attached to the beams (e.g., beams X and Y shown in FIGS. X-Y) of an adjacent pair of the structural elements 206, 208, 210. In these embodiments, when the end structural elements 208, 210 are moved in the outward direction OD relative to the fixed structural element 206, the inner liners and the outer panels are tensioned, which provides structural support to the transportable shelter 100 during various weather conditions (e.g., snow, wind rain, etc.). As explained in more detail below, the tensioning of the inner liners and the outer panels may also provide an insulating function to the transportable shelter 100 that improves the energy efficiency of the transportable shelter 100.

While the illustrated embodiment shows one fixed structural element 206 and two end structural elements 208, 210, it should be understood that the frame 102 can include any other suitable number of fixed and end structural elements based on the desired length of the transportable shelter. For example, in situations in which a shorter length transportable shelter is desired, the transportable shelter 100 may have one fixed structural element and one end structural element that is capable of moving in an outward direction relative to the fixed structural element. In other embodiments, the transportable shelter 100 may have two or more fixed structural elements and two or more end structural elements.

Figure 4:
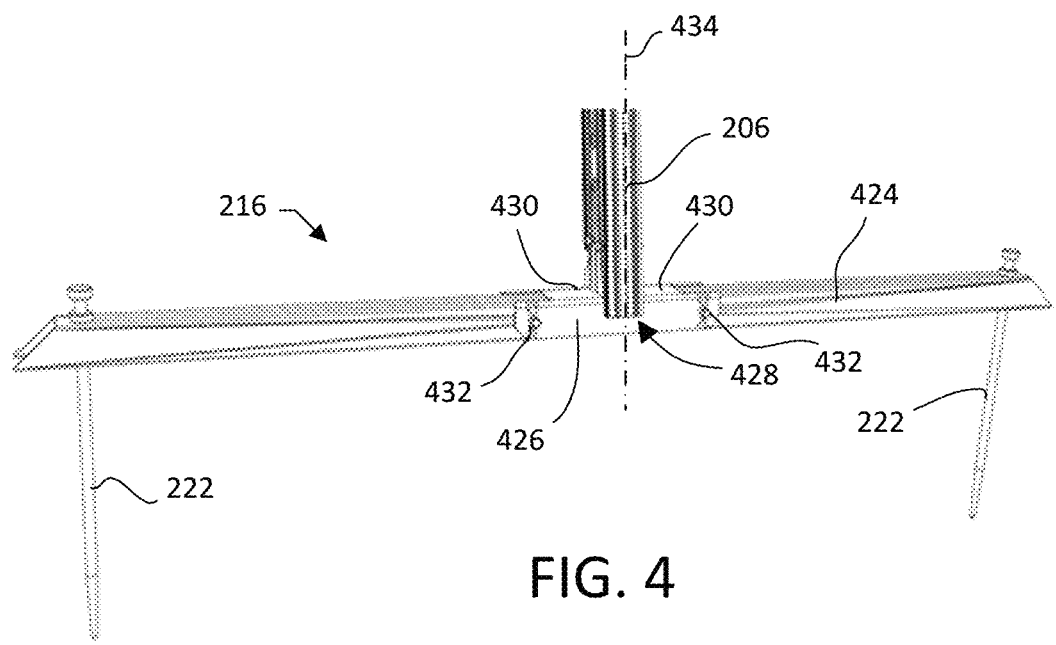
FIG. 4 shows an exemplary embodiment of a base member for a fixed structural element for the frame of FIG. 2.

Referring to FIG. 4, the base member 216 for connecting to and supporting the fixed structural element 206 includes an elongated beam 424 and a support mechanism 426. The structural element 206 may connect to the elongated beam 424 by, for example, a bolt, pin, rivet, or any other suitable coupling component. The support mechanism 426 may be connected to the beam 424 by fasteners 432 (e.g., a removable pin, shackle, bolt, clevis, etc.) and includes an opening 428 defined by wall portions 430 that engage the structural element 206 to prevent the structural element 206 from tipping over center (i.e., moving relative to the axis 434). The elongated beam 424 can be made of a metal material, such as, for example, steel, aluminum, a synthetic metal material, etc. The support mechanism 426 can be made of a metal material, such as, for example, steel, aluminum, etc. The elongated beam 424 connects to a ground surface by a fastener 222 (e.g., a stake, pin, concrete anchor, earth spade anchor, lag screws, earth auger, etc.).

Figure 5:
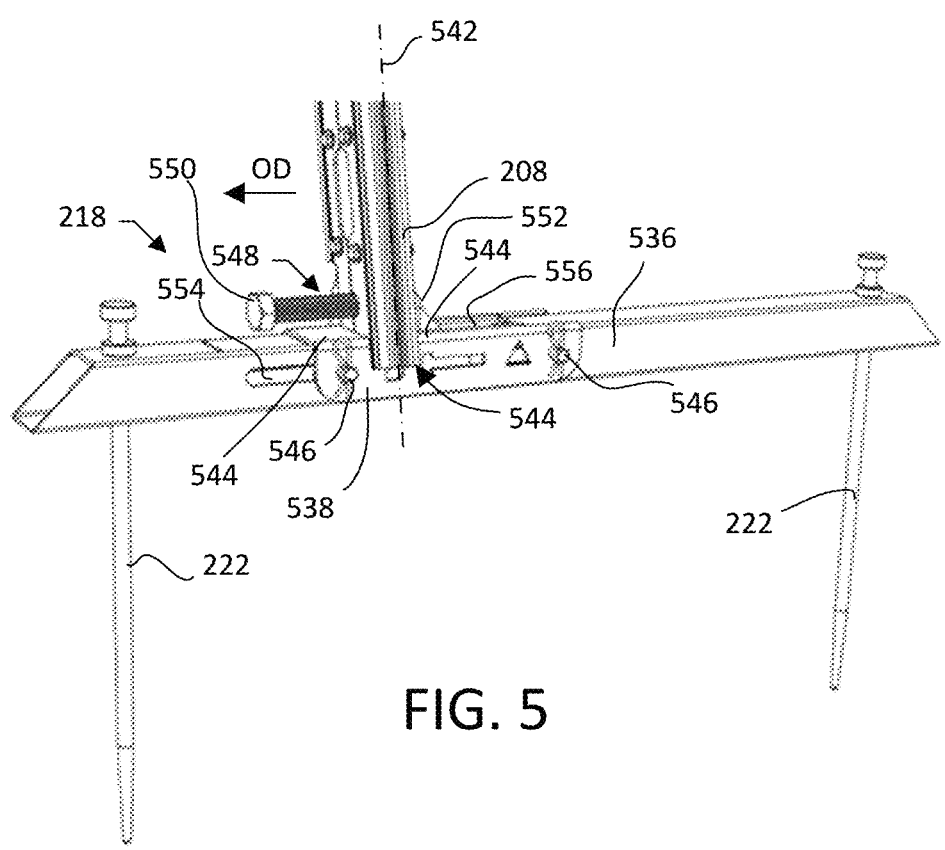
FIG. 5 shows an exemplary embodiment of a base member for an end structural element for the frame of FIG. 2.

Referring to FIG. 5, the base member 218 for connecting to and supporting the end structural element 208 includes an elongated beam 536 and a support mechanism 538. While the embodiment shown in FIG. 5 refers to the base member 218 for connecting to the structural element 208, it should be understood that the base member 218 for connecting to the structural element 210 may be identical but positioned on an opposite side of the transportable shelter 100. The structural element 208 may connect to the elongated beam 536 by, for example, a bolt, pin, rivet, or any other suitable coupling component. The support mechanism 538 may be connected to the beam 536 by fasteners 546 (e.g., a removable pin, shackle, bolt, clevis, etc.) and includes an opening 544 wall portions 540 that engage the structural element 208 to prevent the structural element 208 from tipping over center (i.e., moving relative to the axis 542). The elongated beam 536 can be made of a metal material, such as, for example, steel, aluminum, a synthetic metal material, etc. The support mechanism 538 can be made of a metal material, such as, for example, steel, aluminum, etc. The elongated beam 536 connects to a ground surface by a fastener 222 (e.g., a stake, pin, concrete anchor, earth spade anchor, lag screws, earth auger, etc.).

The base member 218 may also include a tensioning feature 548 that allows the end structural member to be moved in the outward direction OD (as shown in FIG. 3) relative to the fixed structural element 206. The tensioning feature 548 includes a fastener 550 (e.g., a bolt) and a wall 552, where engaging the fastener 550 against the wall 552 causes the end structural element 208 to move in the outward direction OD. For example, in the illustrated embodiment, the structural element includes a channel 554 such that the fasteners 546 can move, which allows the support mechanism 538 and the end structural element 208 to move in the outward direction OD. The wall 552 may be attached to the elongated beam 536, and the support mechanism 538 may include an opening 556 that allows the support mechanism 538 and the end structural element 208 to move in the outward direction OD. The connection between the end structural element 208 and the base member 218 shown in FIG. 7 may be identical at each of the connection points between the base members 218 and the end structural elements 208, 210 (e.g., the connection points LA, LB, RA, RB shown in FIG. 3).

Figure 6:
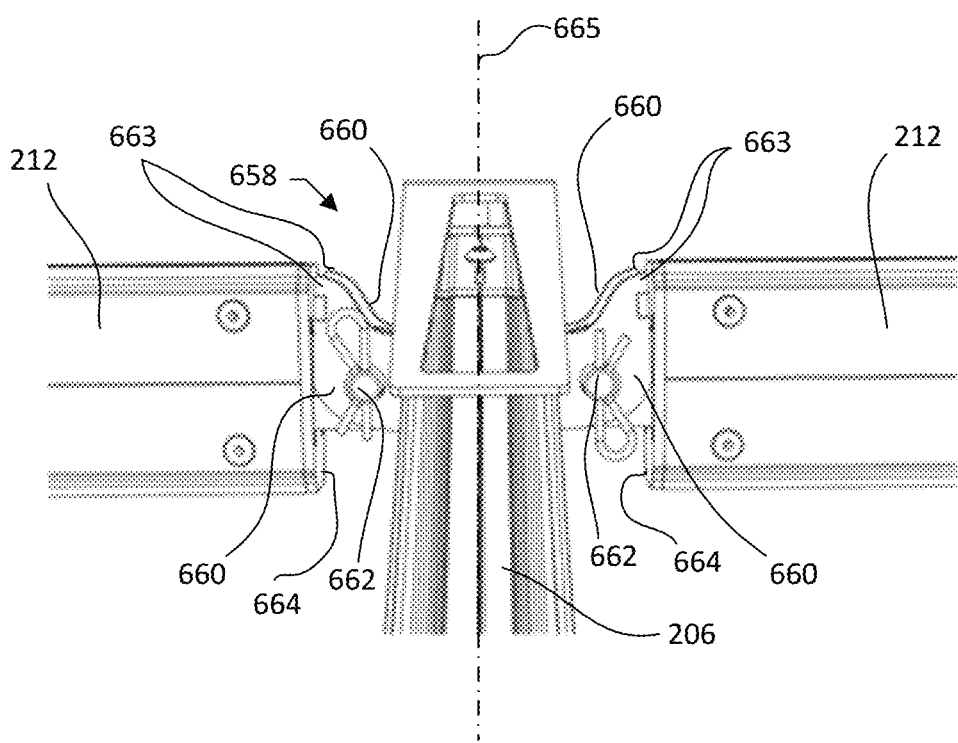
FIG. 6 shows an exemplary connection between purlins and a fixed structural element of the frame of FIG. 2.

Referring to FIG. 6, the frame 102 may include an anti-rotation support mechanism 658 at the connection between the purlins 212 and the fixed structural element 206. The support mechanism 658 includes rigid extension members 660 that are fixedly attached to the structural element 206 (e.g., by a welded connection, a machined assembly connection, a bolted connection, etc.) and pivotally connected to the purlins 212 by a fastener 662 (e.g., a pin, shaft, bolt, or other fastener that allows for rotation of the rigid extension members 660 relative to the fastener 662). The rigid extension members 660 include protrusions 663 that are positioned to engage the side walls 664 of the purlins 212 to prevent the structural element 206 from tipping over center (i.e., moving relative to axis 665). That is, movement of the structural element 206 relative to the axis 665 causes at least one of the rigid extension members 660 to pivot relative to the purlin 212 such that the protrusions 663 engage the side wall 664 of the corresponding purlin 212, and this engagement between the protrusions 663 and the purlin 212 prevents the structural element 206 from tipping over center. In the illustrated embodiment, each of the rigid extension members 660 includes a pair of rigid plates. Each of the rigid extension members 660 can, however, be one or more rigid plates, one or more metal cast components, one or more CNC machined component, or any other suitable rigid member that is capable of engaging the purlin 212 to prevent the structural element 206 from tipping over center. The rigid extension members can be made of, for example, aluminum, steel, a reinforced polymer, or any other suitable material.

Figure 7:
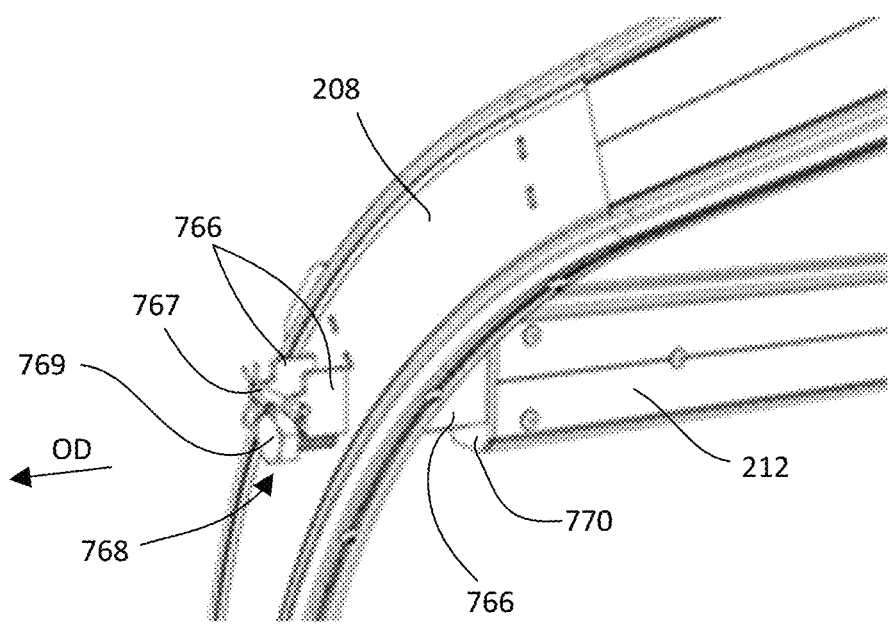
FIG. 7 shows an exemplary connection between a purlin and an end structural element of the frame of FIG. 2.

Referring to FIG. 7, the purlins 212 may connect to the end structural element 208 such that the end structural element 208 can move in the outward direction OD (as shown in FIGS. 3 and 7) relative to the fixed structural element 206. While the embodiment shown in FIG. 7 refers to the connection between the purlins 212 and the end structural element 208, it should be understood that the connection between the purlins 212 and the end structural element 210 may be identical but positioned on an opposite side of the transportable shelter 100. In the illustrated embodiment, the purlin 212 includes extension members 766 that extend through openings of the end structural element 208 such that the extension members 766 can move through the openings of the end structural element, and a fastener 767 (e.g., a pin, shaft, bolt, etc.) connects the extension members 766 to prevent the extension members 766 from entirely moving through the openings of the end structural element 208 and being disconnected from the end structural element 208. In the illustrated embodiment, the pin 767 is disposed on an exterior side of the structural element 208. In other embodiments, the pin 767 may be disposed on an interior side of the structural element 208 (e.g., between the structural element 208 and a side wall 770 of the purlin 212. The extension members 766 may be, for example, plates, metal casting components, CNC machined components, extruded components, or any other suitable members that are capable of extending through openings of the end structural element 208 to attach the purlin 212 to the structural element 208.

The end structural element 208 may include a tensioning feature 768 that allows the end structural member to be moved in the outward direction OD relative to the purlin 212 (and the fixed structural element 206). The tensioning feature 768 may include a fastener 769 (e.g., a bolt, an acme thread, etc.) that is positioned to engage a side wall 770 of the purlin 212, where the engagement between the fastener 769 and the purlin 212 causes the end structural element 208 to move in the outward direction OD. The connection between the end structural element 208 and the purlin 212 shown in FIG. 7 may be identical at each of the connection points between the purlins 212 and the end structural elements 208, 210 (e.g., the connection points LC, LD, LE, RC, RD, RE shown in FIG. 3). In certain embodiments, the fastener 769 of the tensioning feature 768 can be caused to engage the purlin 212 to move the end structural member relative in the outward direction OD by common tools (e.g., a wrench, a ratcheting socket set, powered drill motors, etc.), rather than specialty tools (e.g., hydraulic jacks, rope tensioners, cam buckles, rope locks, etc.). The use of common tools to move the end structural element in the outward direction OD is advantageous because the common tools reduce installation times, increases the amount of shelters an installation team can assemble in a given time frame, reduces fatigue, and reduces long-term maintenance times.

The engagement between the extension members 766, pin 767, fastener 769, and/or side wall 770 may be configured to limit the amount the end structural element 766 can move in the outward direction OD. For example, the length of the extension members 766 and the positioning of the fastener 767 may be sized to limit the movement in the outward direction OD. That is, once the end structural element 208 moves a desired maximum length in the outward direction OD, the fastener 767 engages the end structural element 208 to prevent further movement of the end structural element 208 in the outward direction OD. In certain embodiments, the maximum length that the end structural element 208 can move in the outward direction OD is greater than or equal to 1 inch, such as, greater than or equal to 1.5 inches, such as greater than or equal to 2 inches, such as greater than or equal to 2.5 inches, such as greater than or equal to 3 inches. The movement of the end structural element 208 relative to the fixed structural element causes outer panels (e.g., outer panels 104 shown in FIGS. 1 and 21) and inner liners (e.g., inner liners 2153 shown in FIG. 21) attached to both the end structural element 208 and the fixed structural element 206 to be tensioned. The tensioning of the outer panels and the inner liners provides structural support to and improves the energy efficiency of the transportable shelter 100. As various types of materials can used to make the outer panels and inner liners, the ability to control the amount of movement of the end structural element 208 relative to the fixed structural element 206 is advantageous because it allows a user to provide a sufficient amount of tension to the panels and liners based on the type of material being used. The limitation on the amount in which the end structural element 208 can move relative to the fixed structural element described above is advantageous because it prevents the outer panels and inner liners from being damaged due to over-tensioning.

Figure 8:
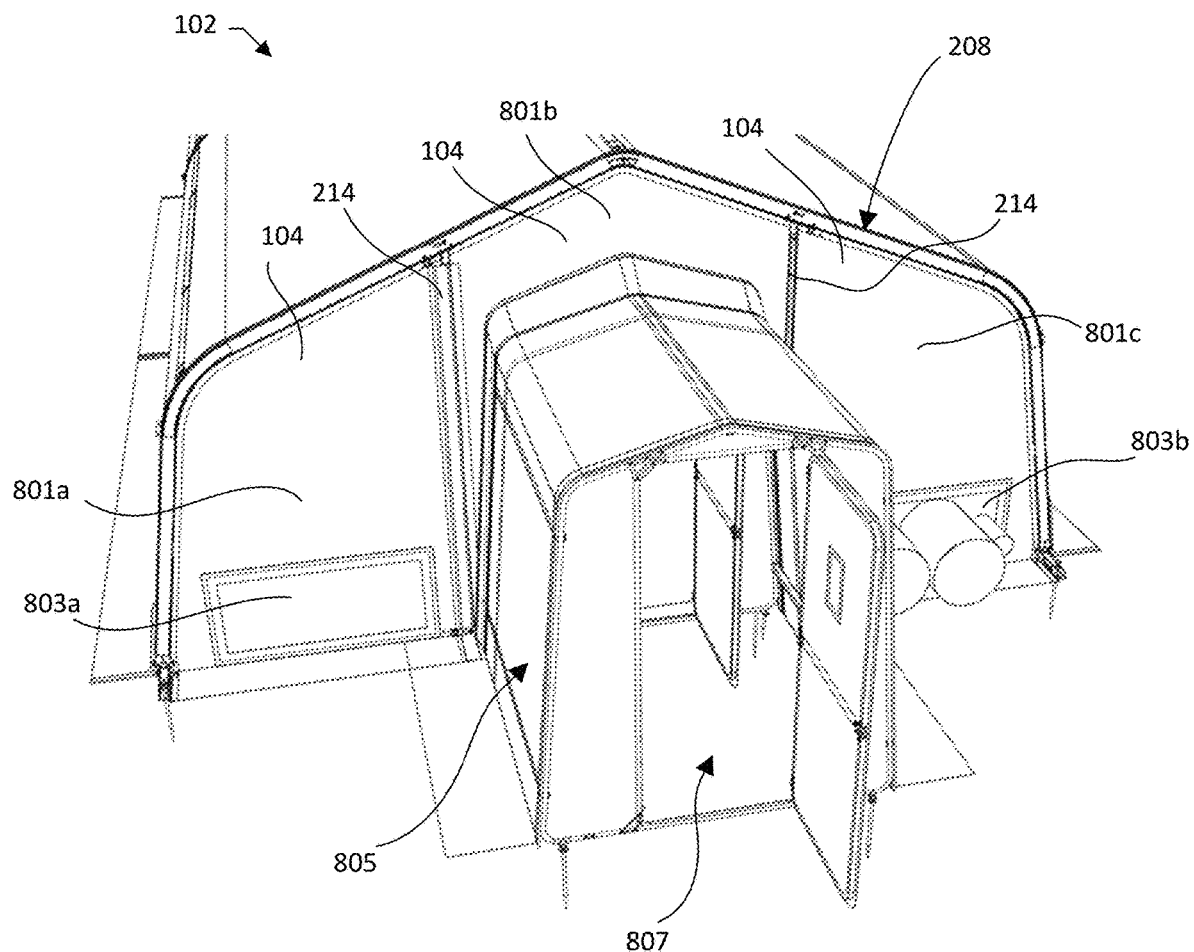
FIG. 8 shows a perspective view of exemplary end panels for connecting to the frame of FIG. 2.

Referring to FIG. 8, the outer panels 104 of the transportable shelter 100 may include end panels 801a-801c that attach to the end structural element 208 and the end wall beams 214 of the frame 102 to define the exterior of the ends of the transportable shelter. While the embodiment shown in FIG. 8 refers to the connection between the end panels 801a-801c and the end structural element 208, it should be understood that the connection between the end panels and the end structural element 210 may be identical but positioned on an opposite side of the transportable shelter 100. The end panels 801a-801c may include outer panels 801a, 801c and middle panel 801b. The outer panels 801a, 801c may include one or more removable portions 803a, 803b. The removable portions 803a, 803c allow for panels related to one or more environmental control units or filtration systems to be attached to the shelter, a mesh screen panel to be installed to promote natural ventilation of the shelter, a translucent panel to promote natural light, or a removable portion that is similar to the outer panel for a uniform appearance. In the illustrated embodiment, the panel 801a includes a removable portion 803a that is similar to remainder of the outer panel 801a, and the panel 801c includes a removable portion 803b that includes connections (e.g., utility, supply, and return duct connections) for attaching to an environmental control unit. The removable portions 803a, 803b may be removably connected to the panels 801a, 801c by at least one of hook and loop fasteners, keder track fabric attachments, keder track extruded aluminum, grommet or rope becket and lacing, or any other suitable type of removable connection element.

In certain embodiments, the connection between the outer panels 801a, 801c and the end structural element 208 and end wall beams 214 of the frame 102 also allows for the use of reversible outer panels 801a, 801c. That is, certain situations require the outer panels 104 to be a first color (e.g., tan), and other situations require the panels 104 to be a second color (e.g., green). The connections between the outer panels 801a, 801c and the end structural element 208 and end wall beams 214 allow the panel 801a to be flipped over (rotated or reversed) and attached at the location where panel 801c is shown as being connected to the structural element 208, and allow the panel 801c to be flipped over (rotated or reversed) and attached at the location where panel 801a is shown as being connected to the structural element 208. In this embodiment, one side of the panels 801a, 801c can be a first color, and the other side of the panels 801a, 801c can be a second color such that a user can easily change the color of the transportable shelter. Similarly, the middle panel 801b can have one side that is a first color and a second side that is a second color, and the middle panel 801b be configured to be flipped over (rotated or reversed) and connected to the same location that the middle panel 801b is shown as being connected to the structural element 208 and end wall beams 214. An exemplary embodiment of connections that allow for the panels 801a-801c to be flipped over (rotated or reversed) is shown in FIGS. 18 through 21 and described in further detail below. In other embodiments, the panels 801a-801c can be connected by a hook and loop connection, a rope and grommet connection, side release buckle connections, etc. In certain embodiments, an entrance chamber or vestibule 805 can be connected to one of the end panels 801a-801c (e.g., the middle panel 801b as shown in the illustrated embodiment), where the entrance chamber 805 includes a door 807 for entering the transportable shelter 100. The top panels and side panels of the entrance chamber 805 may also be reversible.

Referring to FIG. 9, in some embodiments, the end wall beams 214 of the frame 102 are configured to move in an inward direction ID relative to ends 911 of the end structural element 208 after the frame 102 is assembled on-site. For example, a connection between the end wall beams 214 and the end wall base members 909 (at connection points LF, RF), and the connection between the end wall beam 214 and the end structural element 208 (at connection points LG, RG), allows the end wall beams 214 to be moved in the inward direction ID relative to the ends 911 of the structural element 208. While the embodiment shown in FIG. 9 refers to the connection between the end wall beams 214 and the end structural element 208, it should be understood that the connection between the end wall beams 214 and the end structural element 210 may be identical but positioned on an opposite side of the transportable shelter 100.

This movement of the end wall beams 214 relative to the ends 911 of the end structural element 208 creates a tensioning force on the outer end panels 801a, 801c (FIG. 8) of the transportable shelter 100. That is, as explained in more detail below with reference to FIGS. 18 through 21, the outer panels 801a, 801c of the transportable shelter 102 can be attached to beams (e.g., beams 1847 shown in FIGS. 18-21) of the end structural element 208 and an adjacent end wall beam 214. In these embodiments, when the end wall beams 214 are moved in the inward direction ID, the outer end panels 801a, 801c are tensioned, which provides structural support to the transportable shelter 100 during various weather conditions (e.g., snow, wind rain, etc.).

Referring to FIG. 10A (which shows the connection point RG shown in FIG. 9), in certain embodiments, the end wall beam 214 may include a connection element 1020 that is disposed in a slot (not shown) of the structural element 208 such that the end wall beam is slidably connected to the structural element 208. The connection element 1020 may include, for example, a plate, bolt, and/or any other element that is capable of slidably connecting the end wall beam 214 to the structural element 208. A tensioning feature 1022 can be connected to the structural element 208 that can cause the end wall beam 214 to be moved in the inward direction ID. The tensioning feature 1022 can include a fastener 1024 (e.g., a bolt, acme screw, etc.) that a user can cause to engage the end wall beam 214 to move the end wall beam 214 in the inward direction ID. In some embodiments, the structural elements 208, 210 have connection elements (not shown) for attaching to the end wall beams 214 (e.g., at connection points LG and RG shown in FIG. 9), where the connection elements are hinged to the beams of the structural elements such that the connection elements can be folded into the beam during transportation. The hinged connection elements may be configured to pivot and move outside of the beam when the structural elements 208, 210 are assembled such that the connection elements can be attached to the end wall beams 214. The hinged connection elements 208, 210 of the end structural elements 208, 210 are advantageous because they reduce physical pinned connections and installation time, as well saving on shelter volume for transportation.

Referring to FIG. 10B (which shows the connection point LF shown in FIG. 9), in certain embodiments, the end wall base member 909 for connecting to and supporting the end wall beam 214 may include an elongated beam or plate 1013 and a tensioning feature 1015. The elongated beam 1013 may include a slot 1016, and the end wall beam 214 may include a connection element 1018 that is disposed in the slot 1016 to slidable connect the end wall beam 214 to the elongated beam 1013 of the base member 909. The connection element 1018 may include, for example, a plate, bolt, and/or any other element that is capable of slidably connecting the end wall beam 214 to the base member 909. The tensioning feature 1015 causes the end wall beam 214 to be moved in the inward direction ID. The tensioning feature 1015 can include a fastener 1017 (e.g., a bolt, acme screw, etc.) that a user can cause to engage the end wall beam 214 to move the end wall beam 214 in the inward direction ID. The end wall base member 909 may be fastened to a ground surface by a fastener 1019 (e.g., a stake, lag screw, concrete anchor, etc.).

Figure 15:
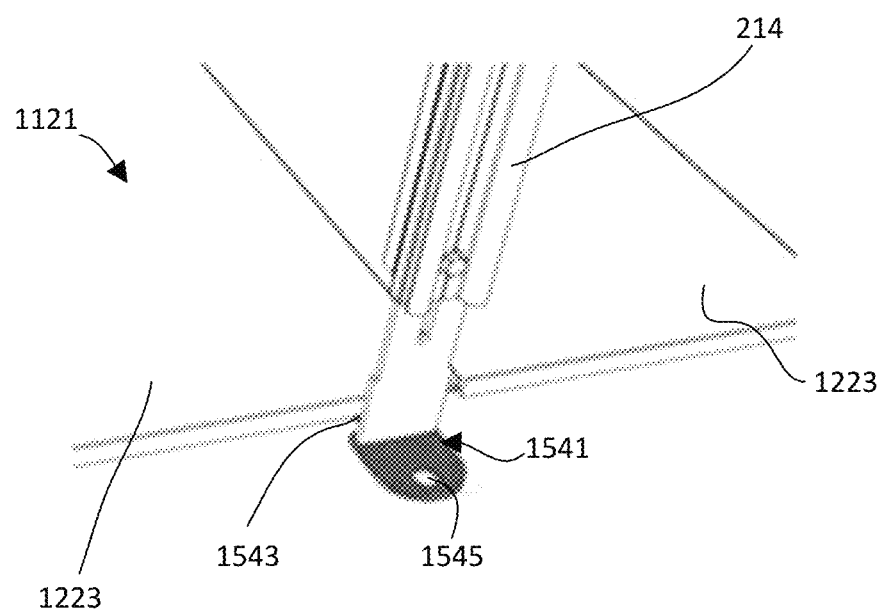
FIG. 15 shows an exemplary connection between an end wall beam of the frame of FIG. 2 and the flooring assembly of FIG. 11.

In alternative embodiments in which the end wall base members shown in FIG. 10B are not utilized, the end wall beams 214 may be attached to a ground surface by a base member that does not include a tensioning feature (e.g., the base member having the opening 1545 shown in FIG. 15). In these embodiments, end panels 801a-801c may be sized such that the panels 801a-801c are tensioned by their connection with the structural element 208 and the end wall beams 214. After the transportable shelter 100 is assembled, the gravitational force caused by various components of the shelter 100 may cause the frame 102 to squat (e.g., cause the connections between the structural elements and the base members to move in an outward direction), which applies a tension to the end panels 801a-801c that are attached to the structural elements 208, 210 and the end wall beams 214.

In any of the embodiments described in the present application, the transportable shelter 100 may include one or more end liners (e.g., similar to liners 2153 shown in FIG. 21) that are attached to the end structural elements 208, 210 such that a dead-air space is created between the end panels 801a-801c. The end liners may be connected to the beams of the end structural elements 208, 210 by a hook connection, a hook and loop connection, a tracked-keder connection, or any other suitable connection. The exterior facing surface of the end liners may include a reflective radiant barrier with low emissivity that reduces or prevents UV rays from entering the shelter. The connection between the end liners and the frame 102 allows the end liners to be flipped over (rotated or reversed) such that the reflective radiant barrier may face an interior of the transportable shelter 100. This is advantageous if the transportable shelter is being used in cold weather conditions where a user desires to keep heat within an interior of the shelter. The reflective radiant barrier may include, for example, metalized foil, biaxially-oriented polyethylene terephthalate (BoPET), Mylar®, polyester, or other types of highly reflective flexible sheets or films. In certain embodiments, the end liners may be configured to attach to adjacent end liners and/or inner liners 2153 such that the frame members (e.g., the structural elements, the end wall beams, etc.) may be covered within the interior of the transportable shelter 100 to prevent leakage (e.g., due to rain or snow) and thermal transfer through the frame. The end liners may attach to each other or to inner liners 2153 by, for example, a hook and loop connection, side release buckles, rope and grommet connections, a slider and tooth connection (or zipper connection), or any other suitable connection.

Referring to FIGS. 11 through 17, in some embodiments, the transportable shelter 100 may include an insulated hard flooring assembly 1121 that is configured to attach to the frame 102 (e.g., at connection points A through J shown on FIG. 11). Referring to FIG. 12, in certain embodiments, the flooring assembly 1121 includes a plurality of interconnecting flooring panels 1223, where each of the flooring panels 1223 includes an upper surface member 1225 and an insulation material 1227. The upper surface member 1225 creates the surface that a user walks on when the flooring assembly 1121 is installed in the transportable shelter 102. The upper surface member 1225 can be an extruded or pressed sheet that is made of, for example, aluminum, polymer, plastic/resin, carbon fiber, etc. The insulation material 1227 can be, for example, polystyrene, closed cell foam, a rigid insulation board, etc.

In certain embodiments, the flooring panels 1223 can include risers 1229 that contact a ground surface when the flooring assembly 1121 is installed in the transportable shelter 100. The risers 1229 can be connected to the upper surface member 1225 and the insulation material 1227 by fasteners 1231 (e.g., nuts, bolts, rivets, screws, etc.) The risers 1229 may be configured to create a dead-air space between the insulation 1227 of the flooring panels 1223 and a floor liner that is attached to the frame 102 and an inner liner (e.g., inner liner 2153 shown in FIG. 21). This dead-air space minimizes any thermal bridge between the floor liner and the upper surface member 1225 of the flooring panels 1223. The risers 1229 can be made of, for example, aluminum, plastic, wood, or any other suitable type of material. The risers 1229 can take any suitable shape that is capable of achieving the dead-air space between the floor liner and the upper surface member 1225 of the flooring panels. In some embodiments, the height of the dead-air space may be configured to allow electrical power cables and communication lines to run under the flooring assembly 1121, which allows for an end user to mount power and/or communication receptacles in the interior of the transportable shelter while maintaining the shelter's air and water tightness.

Referring to FIGS. 12 and 13, the flooring panel 1223 may be connected to an adjacent flooring panel 1223 at connection point CP. Referring to FIG. 13, in some embodiments, the flooring panels 1223 can be connected by a tongue and groove connection. For example, the flooring panels 1223 can have a groove 1333 that is configured to receive a tongue 1335 of an adjacent flooring panel 1223. The tongue 1335 and groove 1333 can take any suitable form that causes the adjacent flooring panels 1223 to be connected. In alternative embodiments, the flooring panels 1223 can be connected by any other suitable type of connection, such as, for example, a friction-fit connection, a snap-fit connection, or any other suitable type of connection. The interconnecting flooring panels 1223 allow for a compact, easily transportable flooring assembly 1121 that is quick to install. In certain embodiments, the flooring panels 1223 are 150 inches in length or less, such as 120 inches or less, such as 90 inches or less, such as 60 inches or less.

Figure 14:
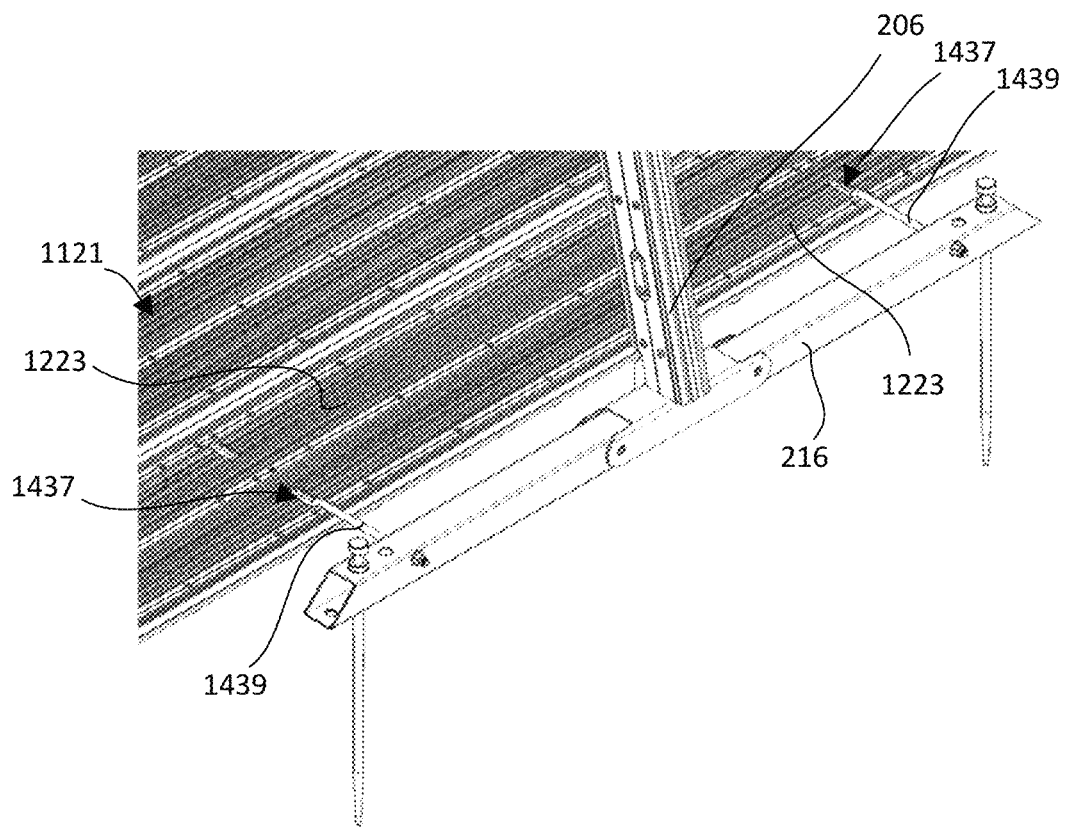
FIG. 14 shows an exemplary connection between the flooring assembly shown in FIG. 11 and the base member for the fixed structural element shown in FIG. 4.

Referring to FIG. 14, at least some of the flooring panels 1223 of the flooring assembly 1121 can include slots 1437 that are aligned with the base member 216 that is attached to the fixed structural element 206 of the frame 102 such that one or more fasteners 1439 (e.g., a tie rod, a textile webbing assembly, a cable/wire rope, a stamped metal connector, etc.) can be inserted through the base member 216 and into the slots 1437 to attach the flooring assembly 1121 to the frame 102. While the connection between the flooring assembly 1121 and the frame 102 is described with reference to one of the base members 216, it should be understood that similar connections between the flooring assembly 1121 and the frame 102 can be made with each of the base members 216, 218 of the frame 102. For example, the connection shown in FIG. 14 can be made at each of the connection points A-C and F-H shown in FIG. 11. The connection between the base members 216, 218 and the flooring assembly 1121 provides additional support to the transportable shelter that allows the shelter to withstand various weather conditions (e.g., wind, snow, rain, etc.).

Referring to FIG. 15, in some embodiments, the end wall member 214 includes a connection element 1541 that is configured to attach to a flooring panel 1223 of the flooring assembly 1121. The connection element 1541 may include an extended member or plate 1543 that extends under the flooring assembly 1121 and an opening 1545 for receiving a fastener (e.g., a stake, concrete anchor, lag screw, pine, etc.) that secures the end wall member 214 to a ground surface. The connection between the ground surface and the connection element 1541 may be a hinged connection or a fixed connection. In embodiments in which two shelters are attached end-to-end (e.g., as shown in FIG. 34), the end wall members 214 of the adjacent end walls of the two individual transportable shelters may be removed and replaced with additional flooring panels 1223 such that the flooring assembly 1121 extends across the entire end-to-end shelter. While the connection between the flooring assembly 1121 and the frame 102 is described with reference to one of the end wall members 214, it should be understood that similar connections between the flooring assembly 1121 and the frame 102 can be made with each of the end wall members 214 of the frame 102. For example, the connection shown in FIG. 15 can be made at each of the connection points D-E and I-J shown in FIG. 11. The connection between the end wall members 214 and the flooring assembly 1121 provides additional support to the transportable shelter that allows the shelter to withstand various weather conditions (e.g., wind, snow, rain, etc.).

Figure 16:
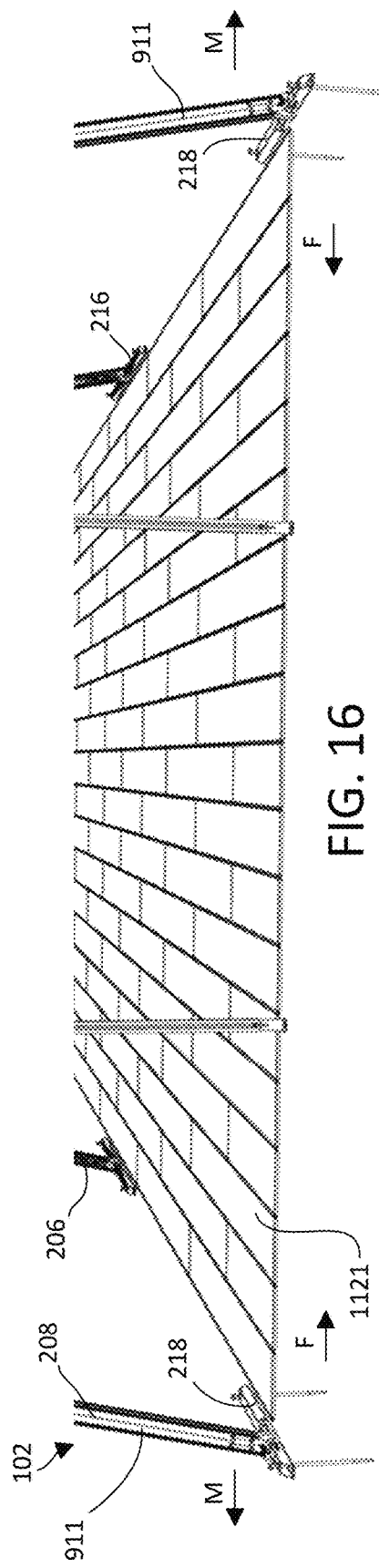
FIG. 16 shows an engagement between the flooring assembly and the frame shown in FIG. 11 when the frame is in a squatting position.
Figure 17:
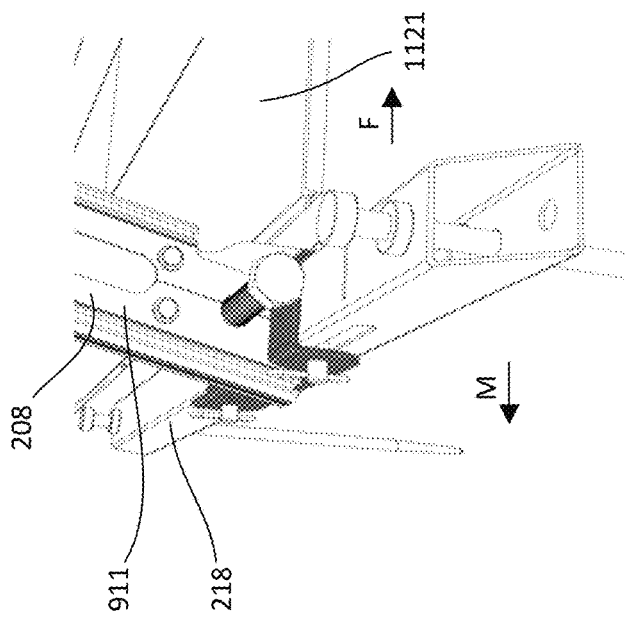
FIG. 17 shows the engagement between a base member of a structural element and the flooring assembly of FIG. 11 when the frame is in a squatting position.

FIGS. 16 and 17 shown the flooring assembly 1121 being installed between the ends 911 of the end structural element 208. As force (e.g., caused by wind, snow, rain, etc.) is applied to the transportable shelter 102, the shelter may squat (e.g., cause the connections between the ends 911 structural element 208 and the base members 218 to move in an outward direction M). As discussed above with reference to FIG. 14, the flooring assembly 1121 may be attached to the base members 218, which provides support to the transportable shelter by providing a force F to the base members 218 in the inward direction that prevents movement of the base members in the outward direction M. While the support provided to the shelter 100 by the connection of the frame 102 to the flooring assembly 1121 is described with reference to end structural element 208 and corresponding base members 218, it should be understood that similar support is provided by the connection between the end structural element 210 and corresponding base members 218 and the connection between the fixed structural element 206 and corresponding base members 216.

Figure 18:
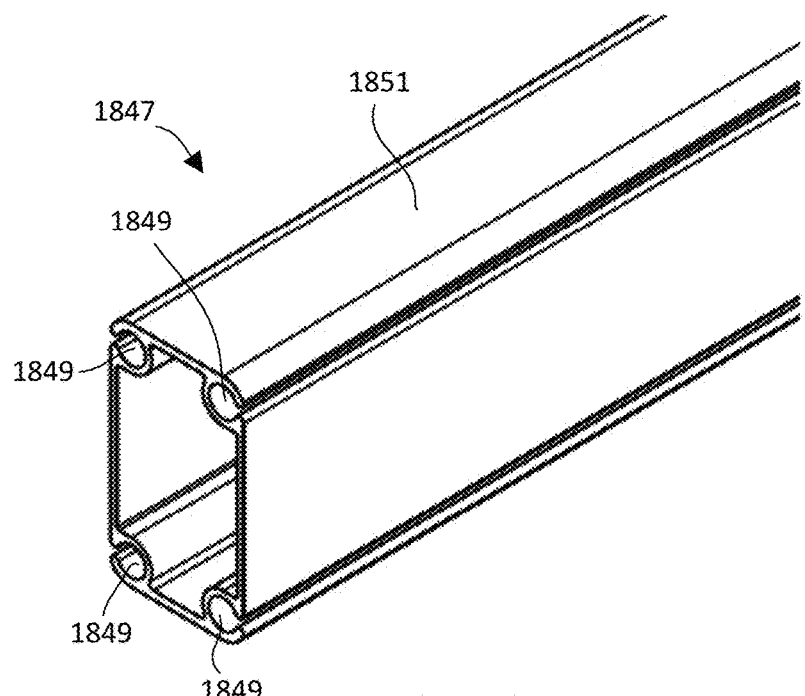
FIG. 18 shows an exemplary embodiment of a beam member for the fixed structural element and the end structural element(s) of the frame of FIG. 2.
Figure 19:
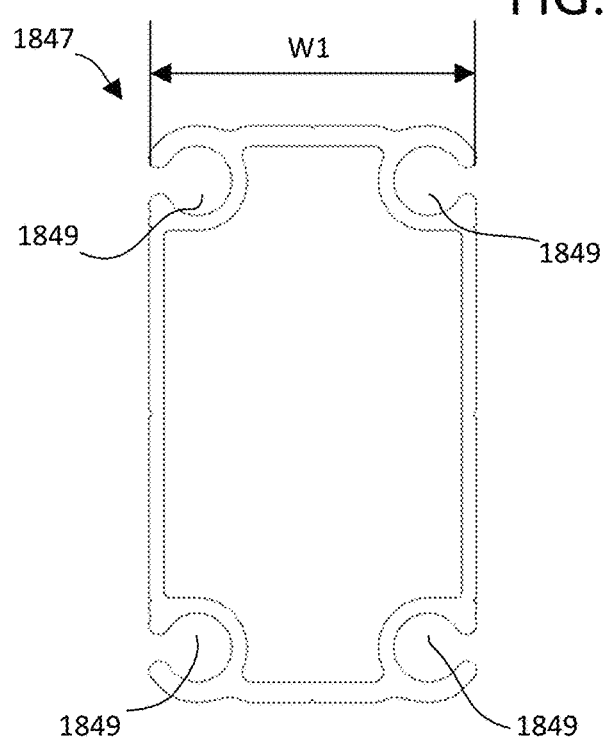
FIG. 19 shows an exemplary embodiment of the beam member of FIG. 18 where the beam member is for the fixed structural element of the frame of FIG. 2.
Figure 20:
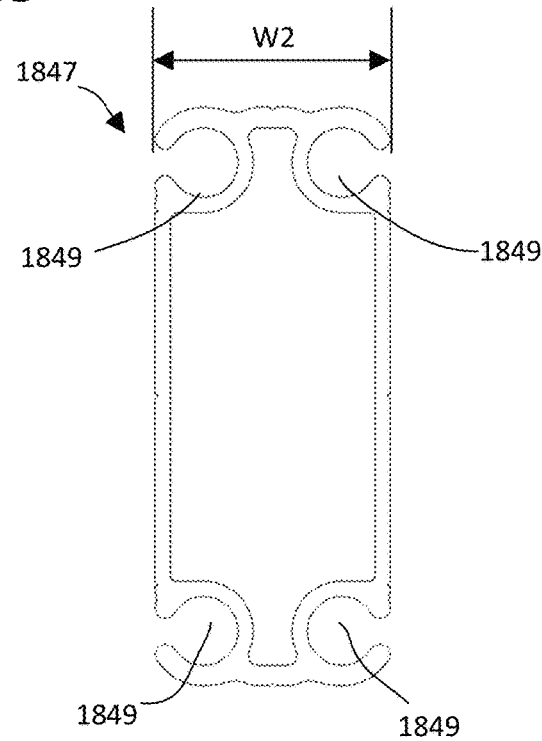
FIG. 20 shows an exemplary embodiment of the beam member of FIG. 18 where the beam member is for the end structural element(s) of the frame of FIG. 2.
Figure 21:
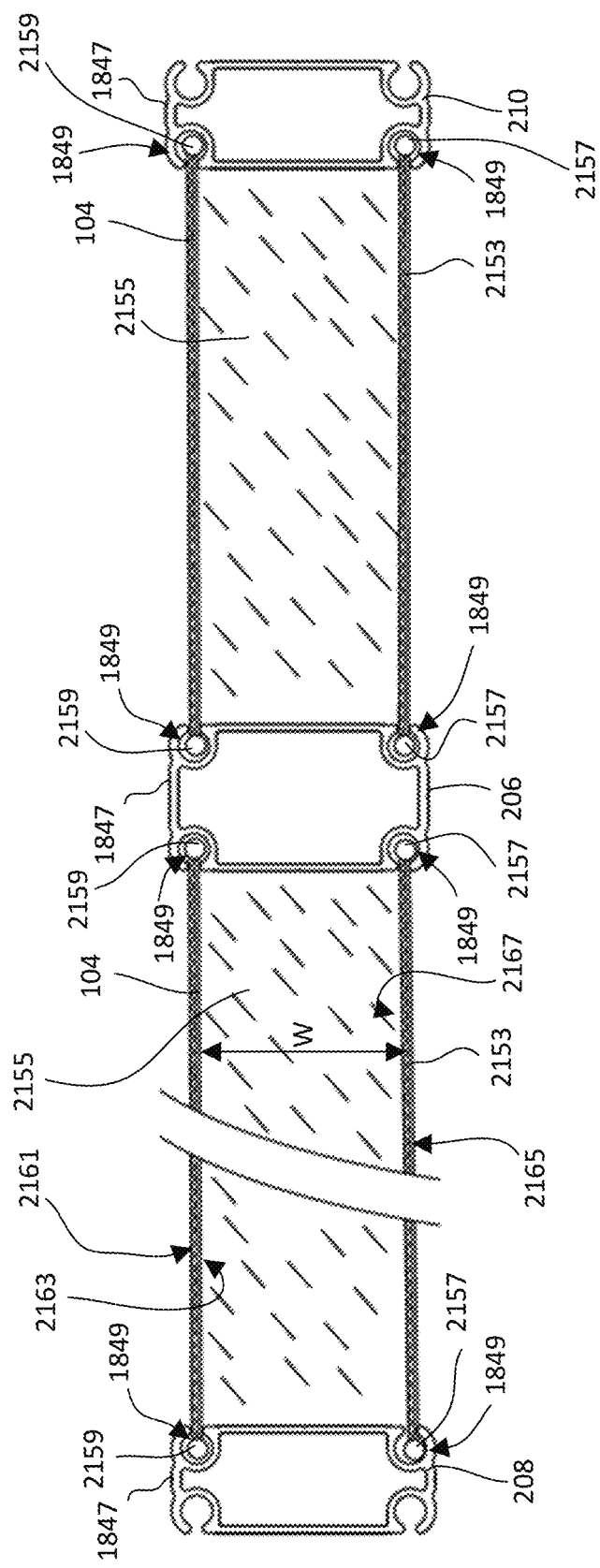
FIG. 21 shows an exemplary connection between an inner liner and outer panels of the transportable shelter and the beam members of the fixed structural element and the end structural element(s) shown in FIGS. 18 through 20.

Referring to FIGS. 18 through 20, in various embodiments, the structural elements 206, 208, 210 can include beam(s) 1847 having tracks 1849 for receiving a connection element (e.g., connection elements 2157, 2159 shown in FIG. 21) of an inner liner (e.g., inner liner 2153 shown in FIG. 21) and/or an outer panel (e.g., outer panel 104 shown in FIGS. 1 and 21). The beam 1847 includes an elongated member 1851 and one or more tracks 1849 extending along a length of the elongated member 1849. In the illustrated embodiment, the beam 1847 includes four tracks 1847, but it should be understood that the beam 1847 can include any suitable number of tracks for connecting panels or liners to the frame 102. Referring to FIGS. 19 and 20, the beam(s) 1847 for the fixed structural element 206 (FIG. 2) can be sized differently than the beam(s) for the end structural elements 208, 210 (FIG. 2). For example, referring to FIG. 19, the beam 1847 for the fixed structural element may have a width W1 that is between about 2 inches and about 5 inches. Referring to FIG. 20, the beam 1847 for the end structural elements 208, 210 may have a width W2 that is less than the width W1, where the width W2 is between about 1 inch and about 3 inches. In certain embodiments, a ratio of the width W1 to the width W2 is between about 1 to 1 and about 5 to 1. The beams 1847 can be made of, for example, aluminum, reinforced polymers, carbon fiber, or any other suitable type of material. The beams 1847 can include machined details (e.g., holes, slots, grooves, etc.) that are configured to receive additional hardware or attachment components (e.g., S-hooks, twist fasteners, rotating connection points) for attaching panels, liners, doors or any other suitable component to the frame 102. While the beams 1847 are described as being used for the structural elements 206, 208, 210, it should be understood that the beams 1847 can also be used for the end wall members 214 (FIG. 2) such that the end panels 801a-801c can be connected to the tracks 1849 of the beam 1847 to connect the end panels 801a-801c to the frame 102.

Referring to FIG. 21, inner liners 2153 and an outer panels 104 of the transportable shelter 100 are attached to the beams 1847 of the structural elements 206, 208, 210 such that an dead-air space 2155 is formed between the inner liner 2153 and the outer panel 104. The liner 2153 has connection elements 2157 for connecting to tracks 1849 of the beam 1847 of both the fixed structural element 206 and the end structural element 208, and the panel 104 has connection elements 2159 for connecting to the tracks 1849 of the beam 1847 of both the fixed structural element 206 and the end structural element 208. The connection elements 2157, 2159 can be, for example, keder rope, keder beads, textile rope, wire rope, extruded PVC, nitrile rubber, buna cords, etc.

The inner liner 2153 and the outer panel 104 are tensioned when the end structural element 206 is moved in the outward direction OD (as described above with reference to FIGS. 3 through 7). This tensioning of the liner 2153 and panel 104 facilitate the creation of the dead-air space 2155. That is, the connection elements 2157, 2159 may have a malleable durometer, and when tension is applied to the liner 2153 and the panel 104, the connection elements 2157, 2159 may compress within the tracks 1849 to create the dead-air space 2155. In certain embodiments, the air tight space 2155 has a width W of between about 2 inches and about 6 inches, such as between about 3 inches and about 5 inches, such as about 4 inches. The air tight space 2155 provides an insulating function to the transportable shelter 100 that improves the energy efficiency of the transportable shelter 100. For example, the dead-air space 2155 can provide an R-value of between about 5 and about 12. In some embodiments, the dead-air space 2155 may have an R-value of greater than or equal to 5, such as greater than or equal to 6, such as greater than or equal to 7, such as greater than or equal to 8, such as greater than or equal to 9, such as greater than or equal to 10, such as greater than or equal to 11, such as greater than or equal to 12.

The outer panel 104 can be made of any suitable material, such as, for example, any material described in the present application. In some embodiments, the outer panel 104 includes a film attached to a woven or knitted material. In certain embodiments, a first surface 2161 of the of the panel 104 is a first color (e.g., tan), and a second surface 2163 of the panel 104 is a second color (e.g., green) such that the outer panel is reversible to allow a user to select a desired color after the transportable shelter 100 is assembled on-site. That is, the connections between connection elements 2159 of the panel 104 can attach to the tracks 1849 of both of the structural elements 206, 208, which allows the panel 104 to be flipped over (rotated or reversed) and connected to the structural elements 206, 208 to change the color of the exterior of the transportable shelter. The reversible outer panels are advantageous because it allows a user to change the color of the shelter without needing to bring additional panels of different colors, which adds to the transportation costs of the shelter.

The inner liner 2153 can be made of, for example, PVC, polyester, nylon, BoPET, Mylar®, high loft insulation materials, radiant barriers, or any other suitably energy efficient membrane. In certain embodiments, an exterior facing side 2167 of the liner 2153 may include a reflective radiant barrier with low emissivity that reduces or prevents UV rays from entering the shelter. The interior facing surface 2165 of the liner 2153 may be configured to optimize interior lighting efficiencies and power usage for the transportable shelter 100. For example, the interior facing surface 2165 may be white or any other color that optimizes lighting efficiencies and power usage. In some embodiments, the connection between the end liners and the frame 102 allows the end liners to be flipped over (rotated or reversed) such that the reflective radiant barrier may face an interior of the transportable shelter 100. This is advantageous if the transportable shelter is being used in cold weather conditions where a user desires to keep heat within an interior of the shelter. The reflective radiant barrier may include, for example, metalized foil, biaxially-oriented polyethylene terephthalate (BoPET), Mylar®, polyester, or other types of highly reflective flexible sheets or films. In some embodiments, in cold weather conditions, the reflective radiant barrier can be combined with an insulation material (e.g., high loft insulation, batt insulation etc.). In certain embodiments, the end liners may be configured to attach to adjacent end liners such that the frame members (e.g., the structural elements, the end wall beams, etc.) may be covered within the interior of the transportable shelter 100 to prevent leakage (e.g., due to rain or snow) and thermal transfer through the frame. The end liners may attach to each other by, for example, a hook and loop connection, a slider and tooth connection (or zipper connection), or any other suitable connection.

Figure 22:
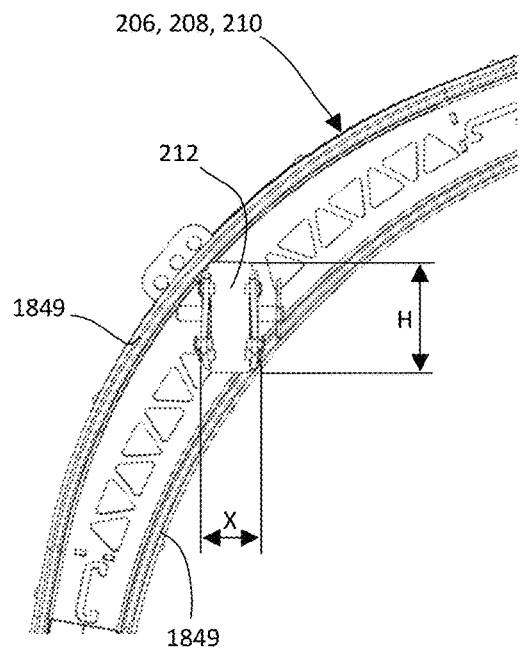
FIG. 22 shows an exemplary embodiment of a purlin for the frame of FIG. 2.
Figure 23:
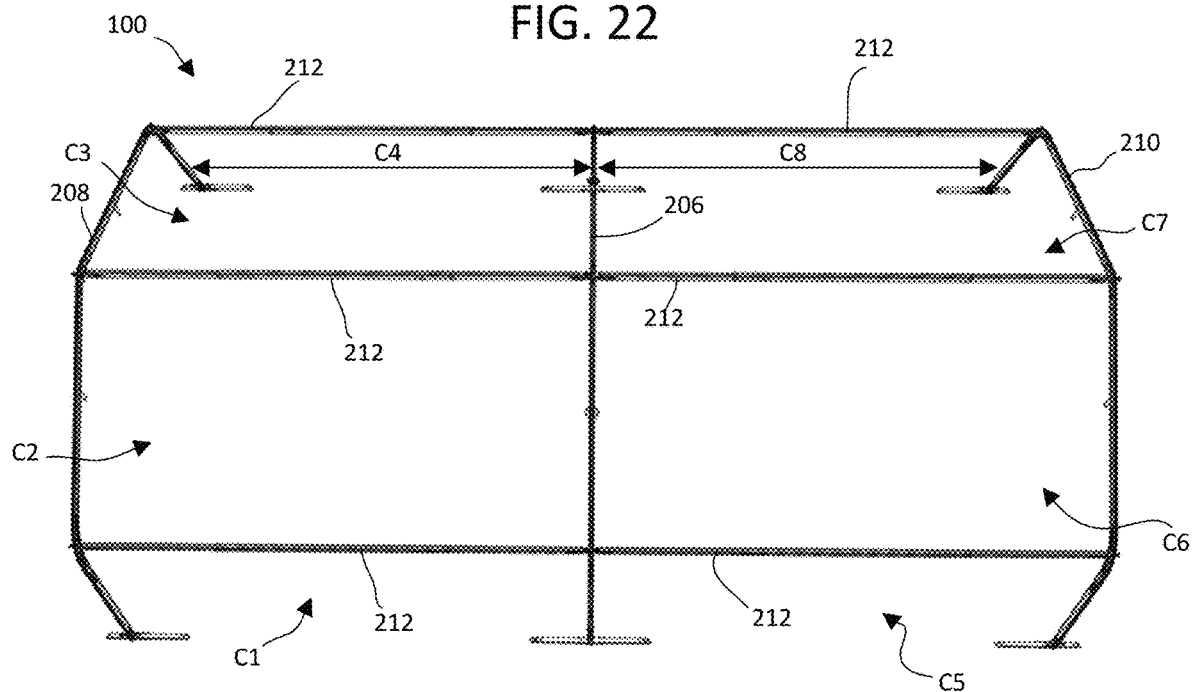
FIG. 23 shows a perspective view of the frame of FIG. 2, illustrating various insulative cavities formed by the various components of the frame of FIG. 2 and the inner liners and outer panels of FIG. 21.

Referring to FIGS. 22 and 23, the purlins 212 may be sized and positioned to create various insulative cavities throughout the transportable shelter 100 that prevent convection currents from moving throughout the shelter 100 as the sun moves relative to the shelter 100 throughout a day. That is, referring to FIG. 22, the purlin 212 may be sized to align with the tracks 1849 of the structural element 206, 208, 210 such that, when the inner liner 2153 (FIG. 21) and the outer panel 104 (FIGS. 1 and 21) are tensioned, the liner 2153 and panel 104 engage the purlin to prevent convection currents from moving beyond the purlin 212. The purlin 212 may have a height H of between about 3 inches and about 7 inches, and the purlin 212 may have a width X of between about 2 inches and about 4 inches. Referring to FIG. 23, in the illustrated embodiment, the transportable shelter 100 may be separated into eight separate insulative cavities (e.g., cavities C1-C8) that are defined by the structural elements, 206, 208, 210, the purlins 212, the inner liners 2153 and the outer panels 104. Each of these cavities C1-C8 prevent the movement of convection currents from moving into the other cavities, which improves the energy efficiency of the transportable shelter 100.

Figure 24A:
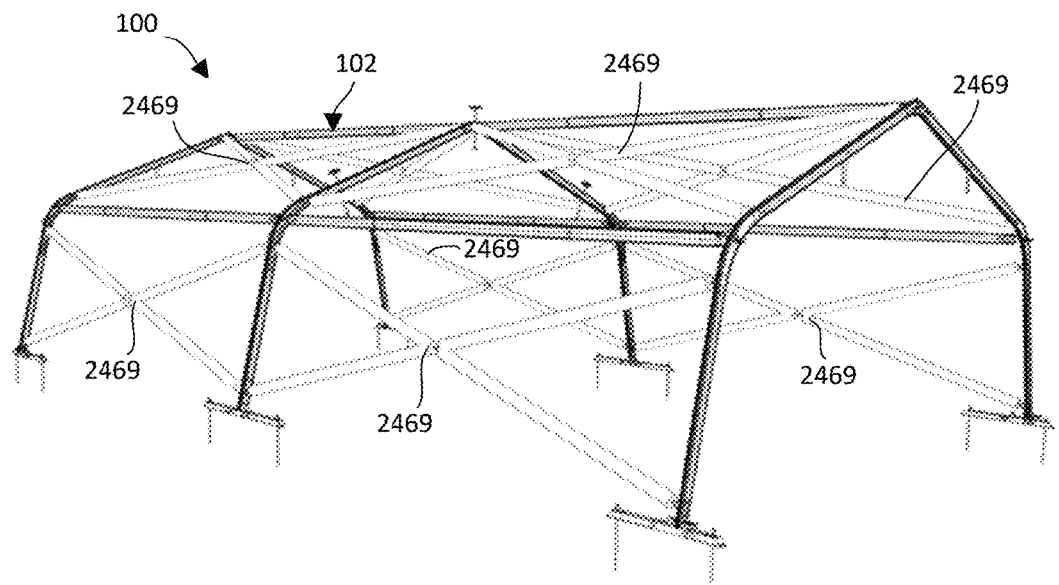
FIG. 24A shows a perspective view of an exemplary embodiment of a bracing assembly that can be used with the transportable shelter of FIG. 1.
Figure 24B:
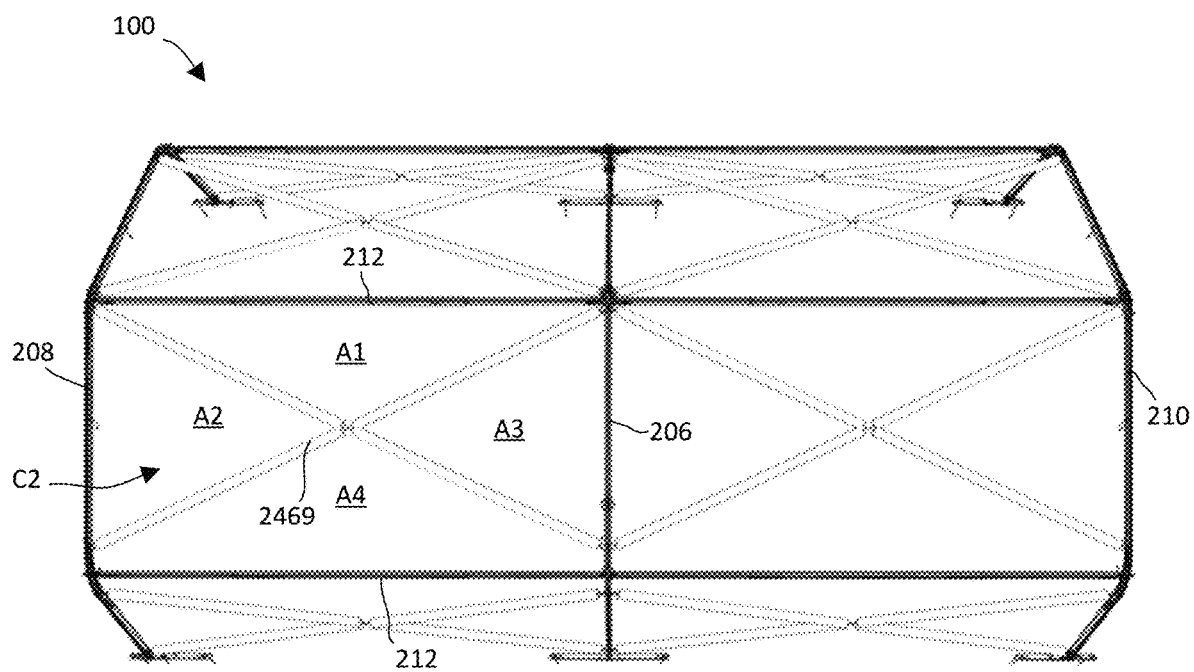
FIG. 24B shows a top view of the bracing assembly of FIG. 24A.

Referring to FIGS. 24A and 24B, the transportable shelter 100 may include one or more X-bracing assemblies 2469 that further prevent the movement of convection currents within each of the separate cavities C1-C8 shown in FIG. 23. In the illustrated embodiment, each of the cavities C1-C8 (shown in FIG. 23) includes an X-bracing assembly 2469. The X-bracing assemblies create further separated areas A1-A4 within each of the cavities C1-C8. Referring to FIG. 24B, for illustrative purposes, the areas A1-A4 created by the X-bracing assembly 2469 will be described with reference to cavity C2 (as shown in FIGS. 23 and 24B), but it should be understood that the X-bracing assembly is similar in each of the cavities C1-C8. Also, while an X-bracing assembly 2469 is shown in each of cavities C1-C8 it should be understood that X-bracing assemblies 2469 may or may not be used in any of the individual cavities C1-C8. Still referring to FIG. 24B, cavity C2 is defined by referenced purlin portions 212, a portion of both the end structural element 208 and fixed structural element 206, the corresponding inner liner (not shown) and the corresponding outer panel 104 (not shown), and a dead-air space exists within this cavity C2. The X-bracing assembly 2469 separates the cavity C2 into four separate dead-air space areas A1-A4 such that convective currents within each area A1-A4 are prevented from moving into adjacent areas A1-A4. This further improves the energy efficiency of the transportable shelter 100. The X-bracing assembly 2469 also adds structural support to the frame 102.

Figure 25A:
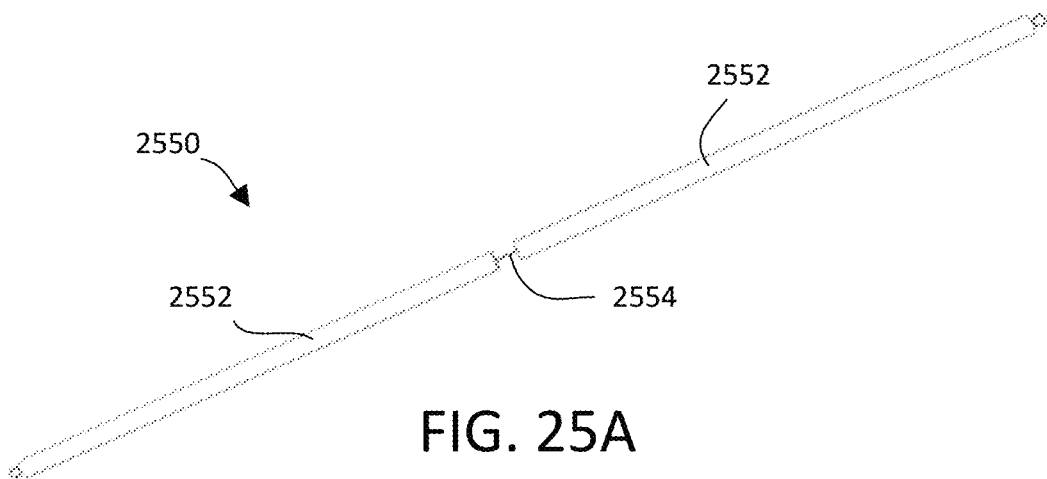
FIG. 25A shows an exemplary embodiment of a bracing element for the bracing assembly of FIG. 24A.
Figure 25B:
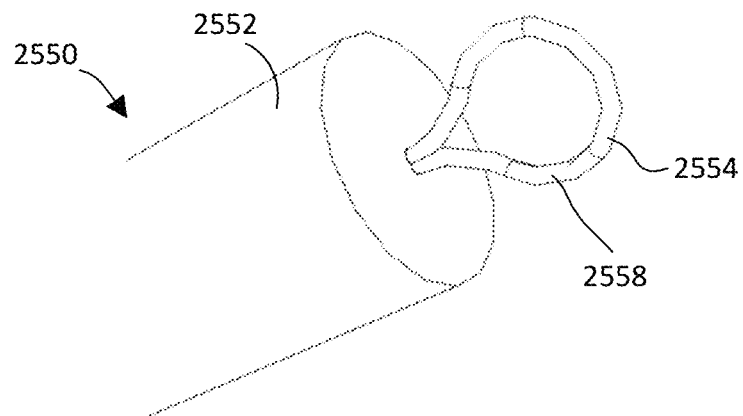
FIG. 25B shows an exemplary embodiment of a connection element for the bracing element of FIG. 25A.

Referring to FIGS. 25A and 25B, the X-bracing assemblies 2469 (FIGS. 24A and 24B) may include two brace members 2550 disposed in a crossed configuration. The brace members 2550 may include one or more insulated portions 2552 and a wire or rope portion 2554. The insulated portions 2552 engage the inner liner 2153 (FIG. 21) and the outer panel 104 (FIG. 21) to insulate the areas A1-A4 (FIG. 24B) from each other. In certain embodiments, the brace members 2550 may be wrapped in a fabric sleeve (not shown) and integrate a flexible skirt (not shown) that engages the inner liner 2153 to ensure that there is no gap between the inner liner 2153 and the X-bracing assemblies 2469 (e.g., due to the weight of components being attached to the inner liner 2153 via support line assemblies 3992 shown in FIGS. 49-42).

Figure 25C:
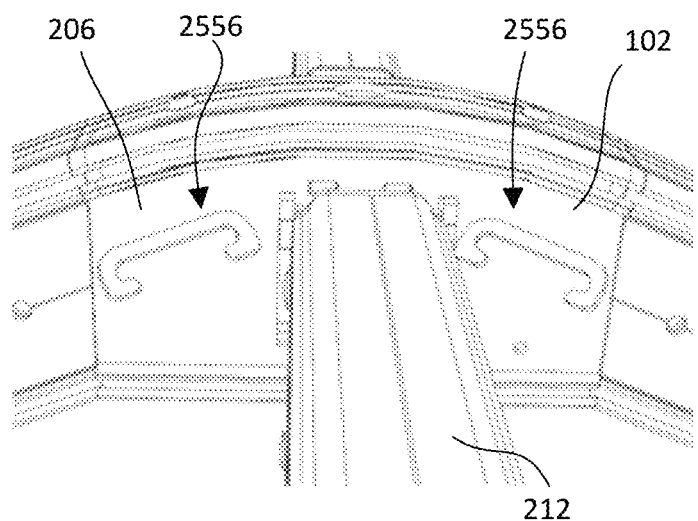
FIG. 25C shows an exemplary embodiment of a connection element of the frame of FIG. 2 for connecting the bracing element of FIG. 25A to the frame.
Figure 26:
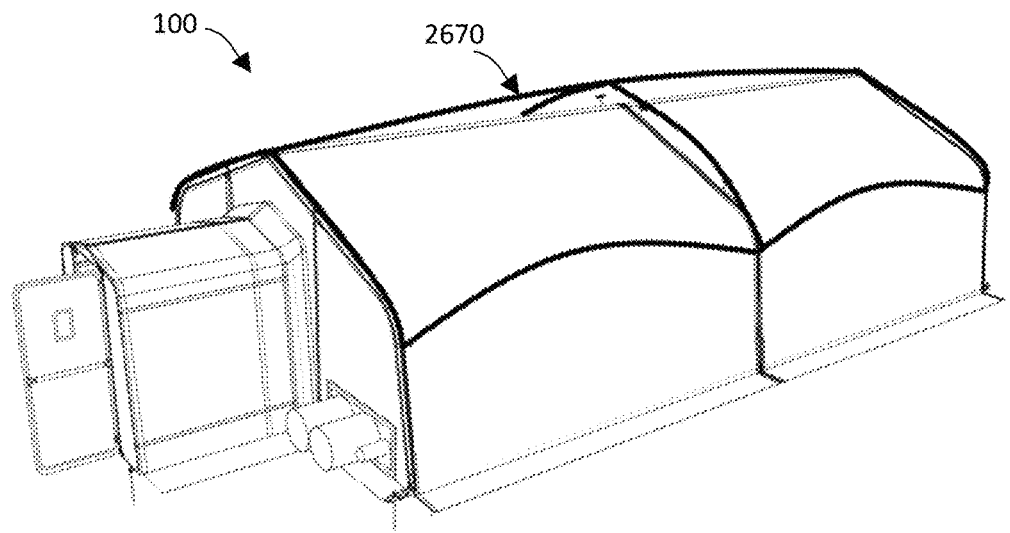
FIG. 26 shows an exemplary embodiment of a solar shade fly that can be used with the transportable shelter of FIG. 1.
Figure 27:
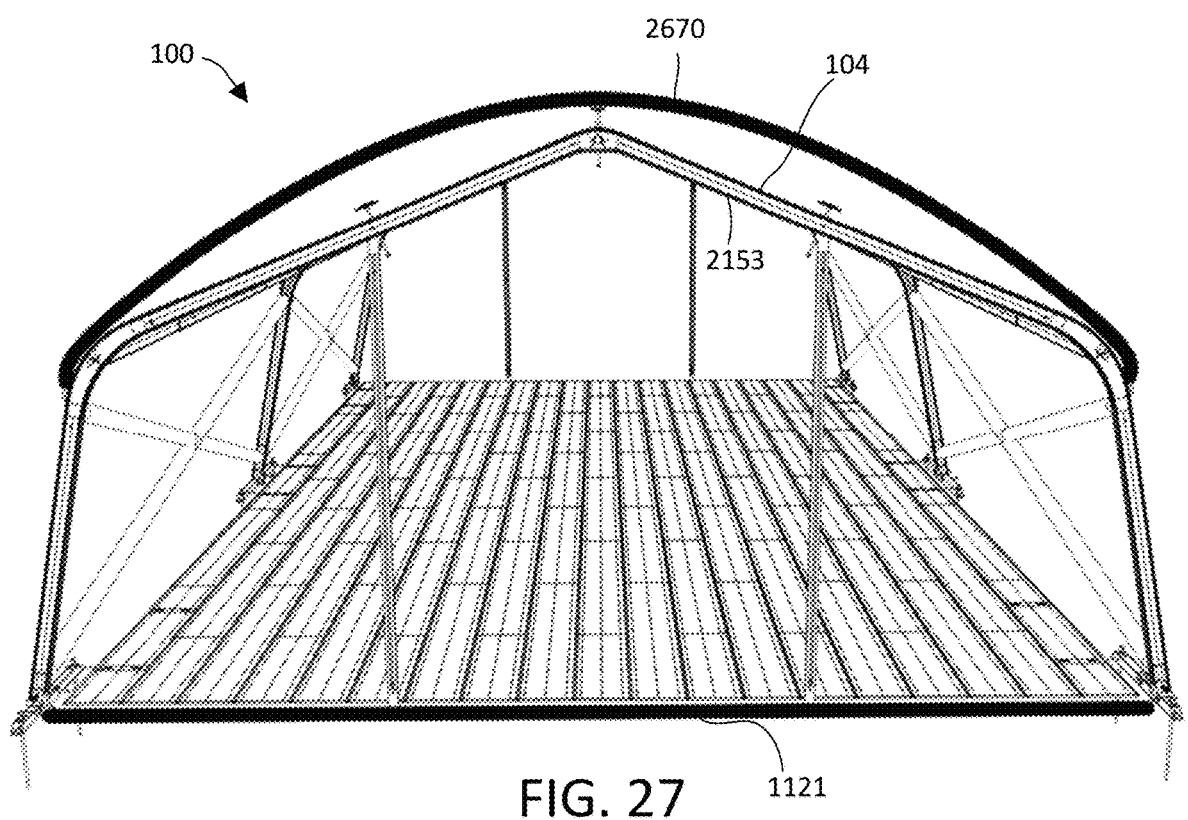
FIG. 27 shows a cross-sectional view of the transportable shelter shown in FIG. 26.

The insulated portions 2552 may include a foam material, such as, for example, high density, closed cell foam. To reduce transportation costs, the insulated portions 2552 may include memory foam such that the insulated portions be configured to be folded, rolled, or packed, and then return to its original shape once ready for connecting to the frame 102. The wire portion 2554 supports the insulated portion and is configured to attach to the frame 102. For example, referring to FIGS. 25B and 25C, the frame 102 may include connection elements 2256 for connecting to a connector 2558 of the wire portion 2554. The connection elements 2256 may include CNC machined slots, grooves, channels, or other means to connect hardware. The connector 2558 of the wire portion 2554 can be, for example, an S-hook, D-ring, webbing or textile accessory, bolted connection, etc.

The connection elements 2256 can be positioned at any desired location on the frame 102 in which a brace member 2550 will be attached.

Figure 28:
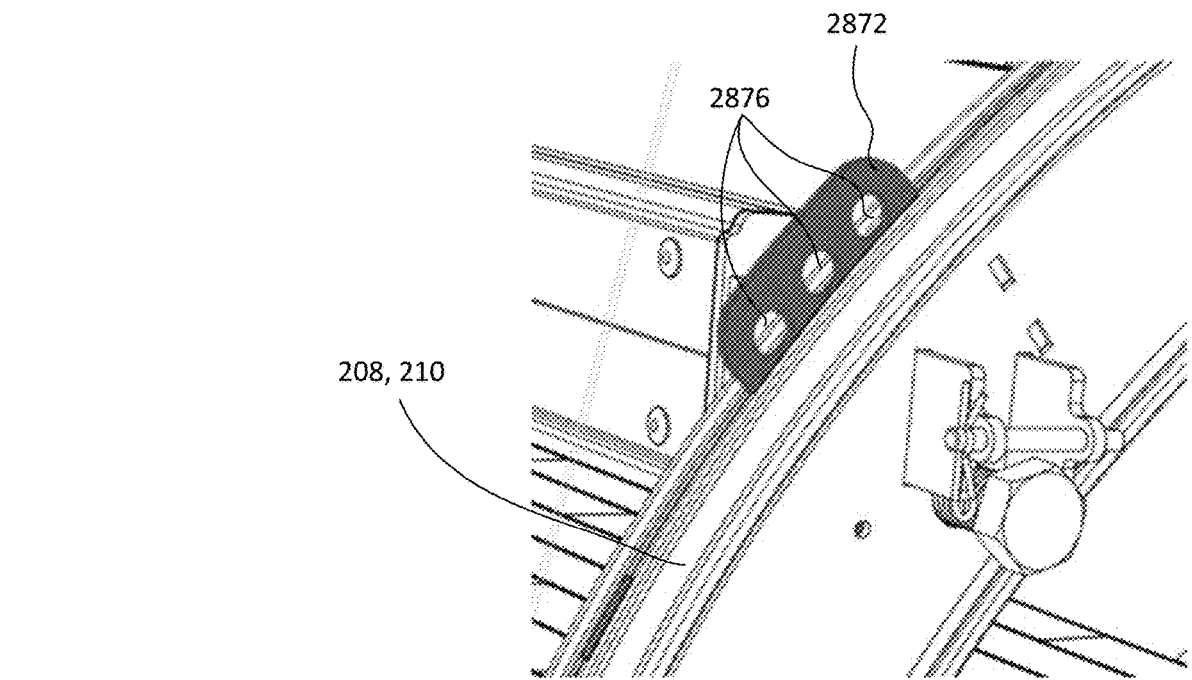
FIG. 28 shows an exemplary embodiment of a connection element for the solar shade fly of FIG. 26 for connecting the solar shade fly to an end structural element of the transportable shelter.

Referring to FIGS. 26-31, in certain embodiments, the transportable shelter 100 includes a solar shade fly 2670 that reduces solar irradiance on the top outer panels 104 and promotes convective air flow for the shelter 100. The solar shade fly 2670 may provide structural benefits to the shelter 100, such as, for example, the ability to handle various weather conditions (e.g., snow, wind, rain). The solar shade fly 2670 may also be attached to connection members 2872 (FIG. 28) during the assembly of the transportable shelter 100, and then one or more tensioning mechanism 2774 (FIGS. 27 and 29) may be used to apply tension to the solar shade fly 2670 from ground level and inside the shelter 100 after the transportable shelter is assembled. Referring to FIG. 28, one or more connection members 2872 may be attached to the end structural elements 208, 210 of the frame 102. In the illustrated embodiment, the connection members 2872 include one or more openings 2876 for receiving a fastener (not shown) to attach the solar shade fly 2670 to the connection member 2872.

Figure 29:
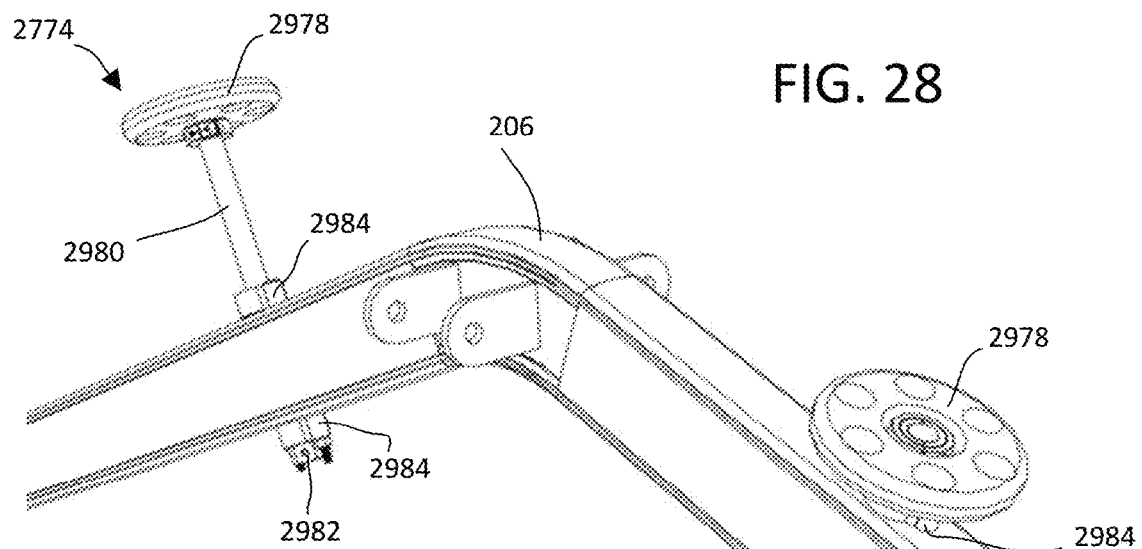
FIG. 29 shows an exemplary embodiment of tensioning elements for the solar shade fly of FIG. 26 where the tensioning elements are attached to a fixed structural member of the transportable shelter.

Referring to FIG. 29, one or more tensioning mechanisms 2774 may be attached to the fixed structural element 206 that can be used to provide tension to the solar shade fly 2670 from a ground surface after the transportable shelter 100 is assembled on-site. The tensioning mechanism 2774 may include a plate member 2978 and an elongated shaft 2980 extending from the plate member. The plate member 2978 and elongated shaft 2980 can be made of, for example, aluminum, steel, plastic, carbon fiber, etc. The plate member 2978 may take the form of a round disk, a square or rectangle, or any other shape that will not damage the solar shade fly 2670 during tensioning. In the illustrated embodiment, the elongated shaft 2980 includes an engagement member 2982 (e.g., threaded rod, acme thread, threaded nuts, shaft collars, washers, or any other component that allows the plate member 2978 to rotate without being damaged) that can be engaged by a user to move the tensioning mechanism 2774 between a retracted position (as shown at position RP on FIG. 29) and an extended position (as shown at position EP on FIG. 29). The elongated shaft 2980 may be threaded, and the tensioning mechanism 2670 may threaded members 2984 that facilitate movement of the tensioning mechanism between the extended and retracted positions. The threaded members 2984 can be disposed internally or externally relative to the frame 102. When the tensioning mechanisms 2774 are in the extended position, the solar shade fly 2670 is tensioned. The tensioning mechanism 2774 is advantageous because a user can engage the engagement member 2982 with a conventional tool (e.g., a standard wrench, standard or deep well nut socket, ratcheting wrench, speed wrench, impact wrench, drill, etc.) from a ground surface in the interior of the shelter 100 to move the tensioning mechanism 2774 between the extended and retracted positions.

Figure 30:
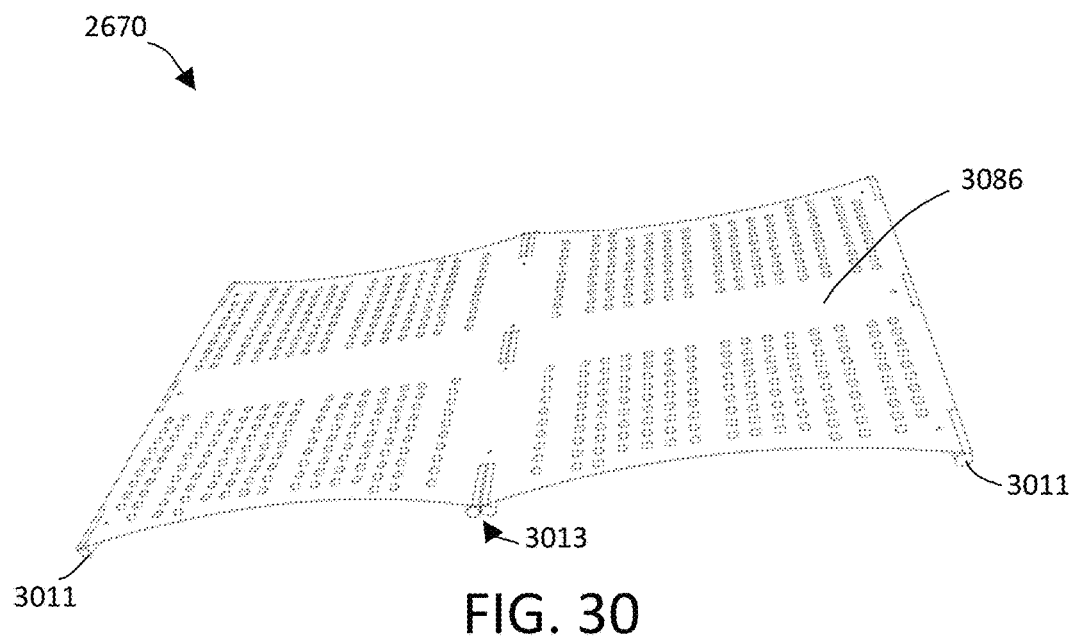
FIG. 30 shows an exemplary embodiment of a first side of the solar shade fly of FIG. 26.
Figure 31:
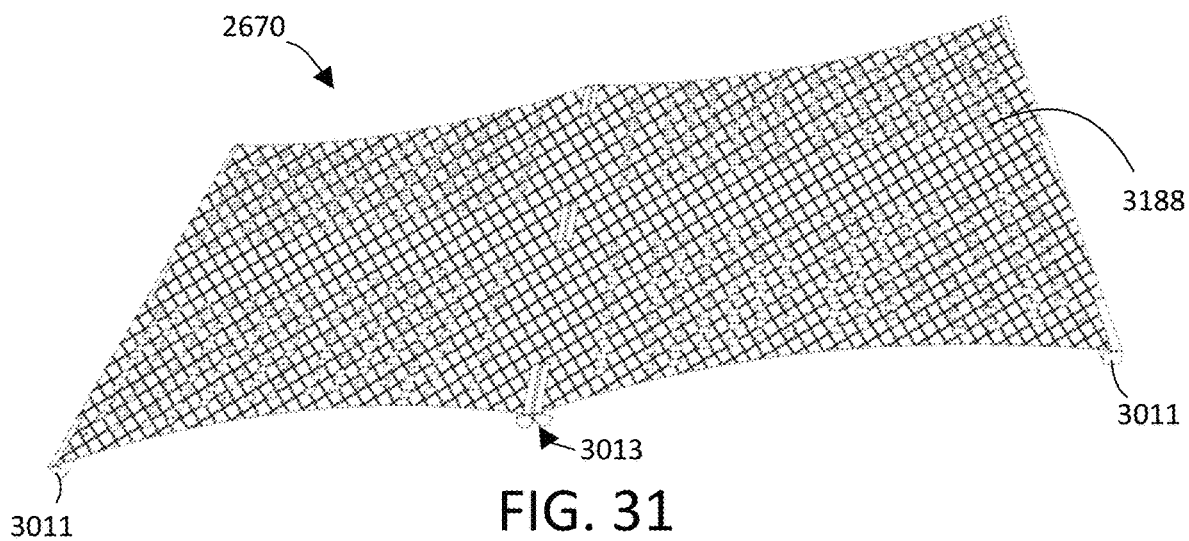
FIG. 31 shows an exemplary embodiment of a second side of the solar shade fly of FIG. 30.

Referring to FIGS. 30 and 31, the solar shade fly 2670 may be made of, for example, laminated PVC, coated PVC, mesh, polyethylene, etc. In certain embodiments, a first surface 3086 (FIG. 30) of the of the solar shade fly 2670 is a first color (e.g., tan), and a second surface 3188 (FIG. 31) of the solar shade fly 2670 is a second color (e.g., green) such that the solar shade fly is reversible to allow a user to select a desired color after the transportable shelter 100 is assembled on-site. That is, the connections between connection members 2872 and the solar shade fly 2670 allows the solar shade fly 2670 to be flipped over (rotated or reversed) to change the color of the exterior of the transportable shelter. The ability to tension the solar shade fly 2670 from the ground level and inside the shelter using the tensioning mechanisms 2774 makes it easy to reverse the solar shade fly 2670 if desired because there is no need to for attaching external components or secondary frame components or apparatuses to the frame 102 to move the solar shade fly 2670 extended position, as is required with typical installation of a solar shade fly. The solar shade fly 2670 promotes convective cooling by being positioned above the outer panels 104 for venting heated air.

Still referring to FIGS. 30 and 31, in some embodiments, end removable standoffs 3011 and/or center removable standoffs 3013 are connected to an interior facing surface of the solar shade fly 2670. The standoffs 3011, 3013 raise the solar shade fly 2670 above outer panels (e.g., outer panels 104 shown in FIGS. 1 and 21) of the transportable shelter 100 to create an air gap that provides shade on the outer panels. The end removable standoffs 3011 are configured to be positioned along a corresponding end structural element 208, 210 when the solar shade fly 2670 is connected to the frame 102, and the center removable standoffs 3013 may include a pairs of standoffs 3013 that straddle the fixed structural element 206 when the solar shade fly 2670 is connected to the frame. The air gap takes advantage of connective current and air flow to purge hot air and reduce temperatures between the solar shade fly 2670 and the outer panels. The air gap may be between about 3 inches and about 12 inches. The standoffs 3011, 3013 may include, for example, foam blocks. The standoffs 3011, 3013 may be removably connected to the first side 3086 (FIG. 30) or the second side 3188 (FIG. 31) of the solar shade fly 2670 such that the standoffs 3011, 3013 can be used to raise the solar shade fly when either side 3086, 3188 is being used as the exterior surface based on the desired color of the transportable shelter. In certain embodiments, the center standoffs 3013 are used instead of the tensioning mechanisms 2774 (FIG. 29) to raise and tension the solar shade fly 2670, which can reduce the costs associated with transporting the transportable shelter 100 due to the weight of the tensioning mechanism 2774 compared to the standoffs 3013.

Referring again to FIG. 27, in certain embodiments, the transportable shelter 100 is fully insulated due to the air tight space 2155 (FIG. 21) created by the tensioned inner liners 2153 and outer panels 104, the detachable and replaceable flooring liner (not shown) that connects to the inner liners 2153 and the inner liner end walls, and the insulated flooring assembly 1121. Furthermore, the cavities C1-C8 (FIG. 23) created by the engagement between the purlins 212 and the inner liners 2153 and outer panels 104, and the X-bracing assemblies 2469 provide additional energy efficient features to the transportable shelter by preventing convection currents from moving throughout the transportable shelter. The above-mentioned features provide for an energy efficient transportable shelter.

Figure 32:
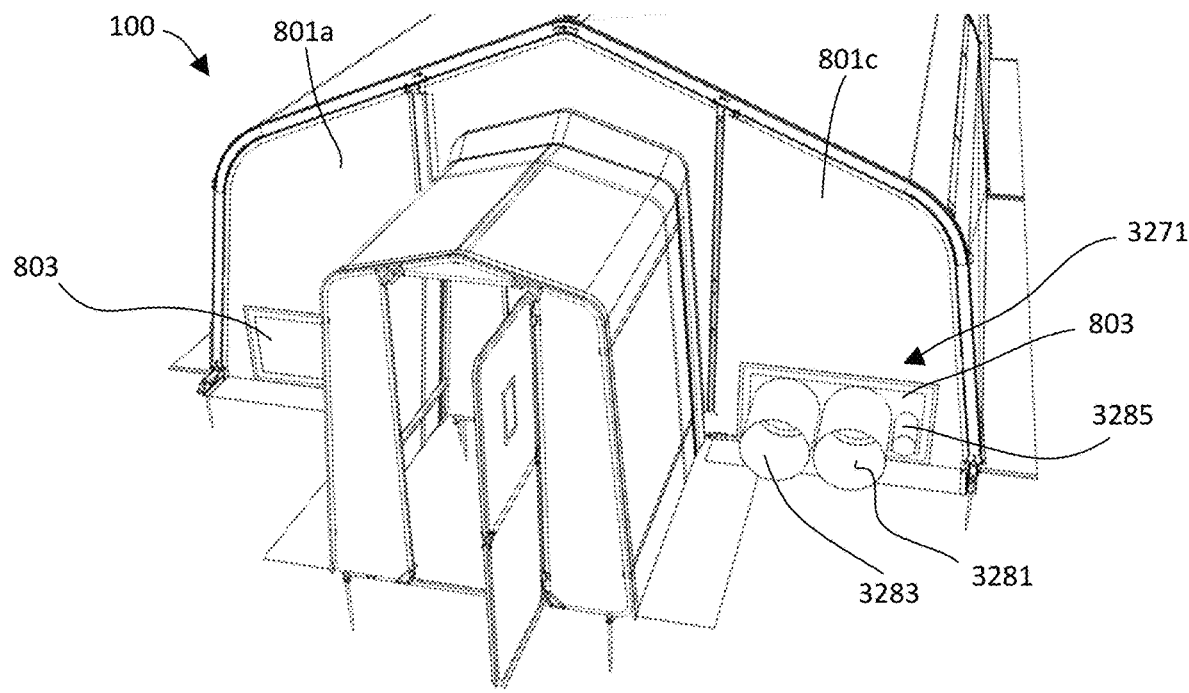
FIG. 32 shows an exemplary embodiment of a connection portion of an end panel of a transportable shelter for connecting to an environmental control unit.
Figure 33:
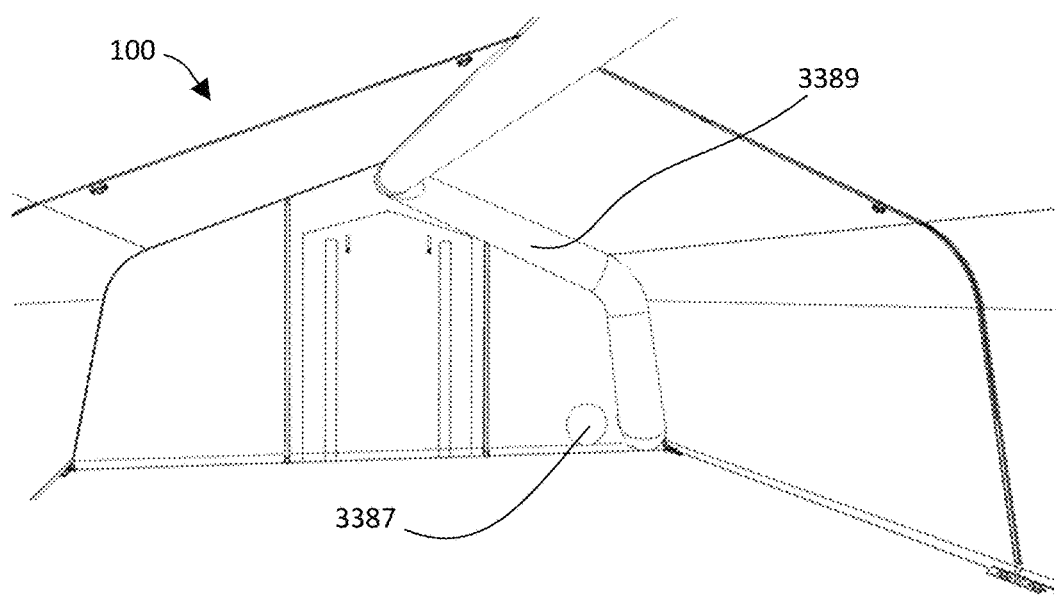
FIG. 33 shows an exemplary embodiment of a supply duct and a return duct for the transportable shelter of FIG. 1, where the supply duct and the return duct are attached to the connection portion of the end panel of FIG. 32.

Referring to FIGS. 32 and 33, the end panels 801a, 801c of the transportable shelter 100 may include removable portions 803. A removable portion 803 may be attached to the end panels 801a, 801c that takes the form of an environmental control unit (ECU) connection portion 3271 such that a supply duct and a return duct (e.g., supply duct 3475 and return duct 3477 shown in FIGS. 34 and 35) of the environmental control unit (e.g., environmental control unit 3479 shown in FIGS. 34 and 35). The ECU connection portion 3271 may include a supply duct connector 3281, a return duct connector 3283, and utility port 3285 (for electrical power service and communication lines). The removable portion 803 and ECU connection portion 3271 may be removable connected to the panels 801*a*, 801*c* by, for example, a hook and loop connection, mating rope and grommets, a zipper connection, or any other suitable connection. The ECU connection portion 3271 can be attached to any of the panels 801*a*, 801*c* on either side of the transportable shelter 100. Referring to FIG. 33, the ECU connection portion 3271 provides a return opening 3387 for the return air to move from an interior of the transportable shelter 100 to the environmental control unit and an easy connection to an interior supply duct 3389 of the transportable shelter. Inner liner end walls (not shown) positioned interior to the end panels 801*a*, 801*c* can also support openings that align with the removable portions 803, and the inner liner end walls can be constructed so that they can be closed off or covered up when not in use.

FIG. 34 shows a transportable shelter assembly 3400 that includes a pair of transportable shelters 100 attached in an end-to-end configuration, where both of the transportable shelters 100 are attached to the same environmental control unit 3479. Each transportable shelter 100 includes a door 809 at opposite ends, and a central area 3491 is positioned between the transportable shelters where the supply ducts 3475 and return ducts 3477 of the environmental control unit 3479 attach to the two shelters 100. While the illustrated embodiment shows two transportable shelters being attached in an end-to-end configuration, it should be understood that any suitable number of transportable shelters can be attached in an end-to-end configuration based on the desired size of the transportable shelter assembly 3400 by the user and/or the desired size of the environmental control unit 3479 that is attached to the transportable shelter assembly 3400.

FIG. 35 shows a transportable shelter assembly 3500 that includes a pair of transportable shelters in a side-by-side configuration, where both of the transportable shelters 100 are attached to the same environmental control unit 3479. Each transportable shelter 100 includes a door 809, and the supply and return ducts are attached to end panels of each of the shelters 100. While the illustrated embodiment shows two transportable shelters being attached in a side-by-side configuration, it should be understood that any suitable number of transportable shelters can be attached in a side-by-side or radial configuration based on the desired size of the transportable shelter assembly 3500 by the user and/or the desired size of the environmental control unit 3479 that is attached to transportable shelter assembly 3500.

Referring to FIGS. 34 and 35, the shelter assemblies 3400, 3500 are designed to be energy efficient while connecting two or more transportable shelters 100 to a single environmental control unit 3479. For example, the shelter assemblies 3400, 3500 are designed for an operational temperature range of −25° F. to +125° F. when located austere environments. In high temperature environments, the shelter assemblies 3400, 3500 may provide an inside temperature that is 40° F. cooler than external ambient temperature. In cooler temperature environments, the shelter assemblies 3400, 3500 may provide an inside temperature that is 75° F. warmer than external ambient temperature.

Referring to FIGS. 34 through 36 and FIGS. 37A-37D, in certain embodiments, the transportable shelter assemblies 3400, 3500 may include an air distribution block 3493 that allows a pair of transportable shelters 100 to be attached to the same environmental control unit 3479. Referring to FIG. 36, the Y-duct 3493 includes return inlets 3694 that receive return air from the transportable shelters 100, and the return air then moves through the return air outlet 3695 such that the return air moves to the environmental control unit 3479 (FIGS. 34 and 35). The Y-duct 3493 includes a supply inlet 3696 that receives air from the environmental control unit 3479 and sends the air through supply outlets 3697 such that the air can move each to each of the transportable shelters 100. While the return inlets 3694 and outlet 3695 are shown being stacked on top of the supply inlet 3696 and outlets 3697, it should be understood that the supply openings can be stacked on top of the return openings. The stacking of the supply and return openings cause the air distribution block 3493 to act as a heat exchanger by allowing for pre-conditioning of the supply and return air, which improves the energy efficiency. In certain embodiments, the supply and return openings can be closed off when not being used. The size of the supply and return openings can be adjusted to receive various sized diameter ducting. The air distribution block 3493 can be made of, for example, aluminum, steel, plastic, plastic with fabric connections, etc. In certain embodiments, the air distribution block 3493 can be disassembled to decrease the volume of the Air distribution block, which is advantageous for transporting the Air distribution block.

Referring to FIGS. 37A through 37D, another exemplary embodiment of an air distribution block 3493 includes one or more panels 3740 that are removable connected, where each panel 3740 includes an opening 3742 for connecting to an environmental control unit or a transportable shelter. The panels 3740 can be made of, for example, laminated PVC fabric, coated PVC fabric, or any other suitable type of material. As compared to the embodiment of the air distribution block 3493 shown in FIG. 36, the embodiment of the air distribution block 3493 shown in FIGS. 37A through 37D are single blocks that can be used as either a supply air distribution block or a return air distribution block, but the single blocks can be stacked to create a stacked configuration that is similar to the air distribution block shown in FIG. 36. Referring to FIG. 37A, the panels 3740 can be disconnected and stacked, which is advantageous for storage and transportation. Also, a user can attach the panels 3740 to create various desired shapes, which allows a user to assemble an air distribution block 3493 on site based on the number of transportable shelters that will be connected to the same environmental control unit. For example, for the transportable shelter assemblies 3400, 3500 shown in FIGS. 34 and 35 that include two transportable shelters using the same environmental control unit 3497, an air distribution block 3493 having two openings for connecting to the two transportable shelters and one opening for connecting to the environmental control unit is needed. Referring to FIG. 37B, in these situations, a user can connect three panels 3740 together to create an air distribution block 3493 having triangular shape for the supply air connections, and the user can connect three more panels 3740 together to create another air distribution block 3493 having a triangular shape for the return air connections. These two air distribution blocks 3493 can then be stacked or disposed side-by-side during use. In certain embodiments, a first side of the panels 3740 are a first color (e.g., tan) and a second side of the panels 3740 are a second color (e.g., green), such that a user can determine on site what color to make the air distribution block 3493 such that it corresponds to the color of the transportable shelter 100.

In some situations, a single environmental control unit may be connected to three transportable shelters. Referring to FIG. 37C, in these situations, a user can connect four panels 3740 to create an air distribution block 3493 having a rectangular shape for the supply air connections, and the user can connect four more panels together to create another air distribution block having a rectangular shape for the return air connections. Three of the four panels 3740 connect to the three transportable shelters, and the other panel connects to the environmental control unit. Referring to FIG. 37D, if an environmental control unit is to be connected to four transportable shelters, a user can create supply and return air distribution blocks 3493 that each have five panels 3740 to create a pentagonal shape, where four of the panels connect to the four transportable shelters and the other panel connects to the air distribution unit. Referring to FIGS. 37A-37D, a user can create air distribution blocks using any suitable number of panels 3740 to create any suitable shape based on the amount of transportable shelters that the air distribution block will be connecting to an environmental control unit. For example, the panels 3740 can be connected to create air distribution blocks 3493 having a triangular shape, a rectangular shape, a pentagonal shape, a hexagonal shape, a heptagonal shape, an octagonal shape, etc. In any of these embodiments, the supply and return air distribution blocks corresponding to a single environmental control unit can be stacked (e.g., similar to the air distribution block 3493 shown in FIG. 36) or disposed in a side-by-side configuration. The panels 3740 can be connected to create the air distribution units by, for example, a hook and loop connection, a zipper connection, a snap-fit connection, extruded connections, a hook connection, or any other suitable type of connection.

In some embodiments, the air distribution blocks 3493 shown in FIGS. 37A through 37D can include a top cap panel (not shown) and a bottom cap panel (not shown) such that the air distribution blocks are fully enclosed when attached to the transportable shelters and the environmental control unit. The top cap panel and the bottom cap panel can attach to the other panels 3740 of the air distribution blocks 3494 by, for example, a hook and loop connection, side release buckles, a zipper connection, a snap-fit connection, extruded connections, a hook connection, or any other suitable type of connection. The top and bottom cap panels can be made of, for example, aluminum, steel, plastic, fabric, suitable synthetic materials, etc. The shapes of the top and bottom cap panels correspond to the shape of the assembled air distribution blocks formed by the panels 3740. For example, the top and bottom cap panels may have a triangular shape, a rectangular shape, a pentagonal shape, a hexagonal shape, a heptagonal shape, an octagonal shape, etc.

Figure 38A:
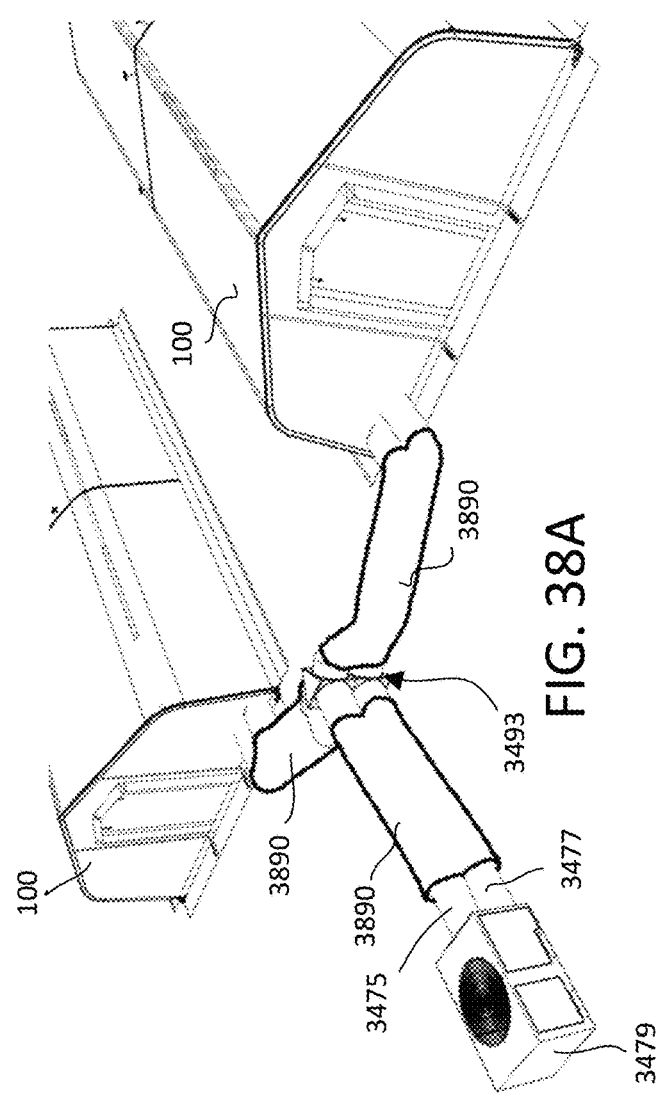
FIG. 38A shows an exemplary embodiment of an insulated wrap for supply and return ducts attached to a transportable shelter and an environmental control unit.
Figure 38B:
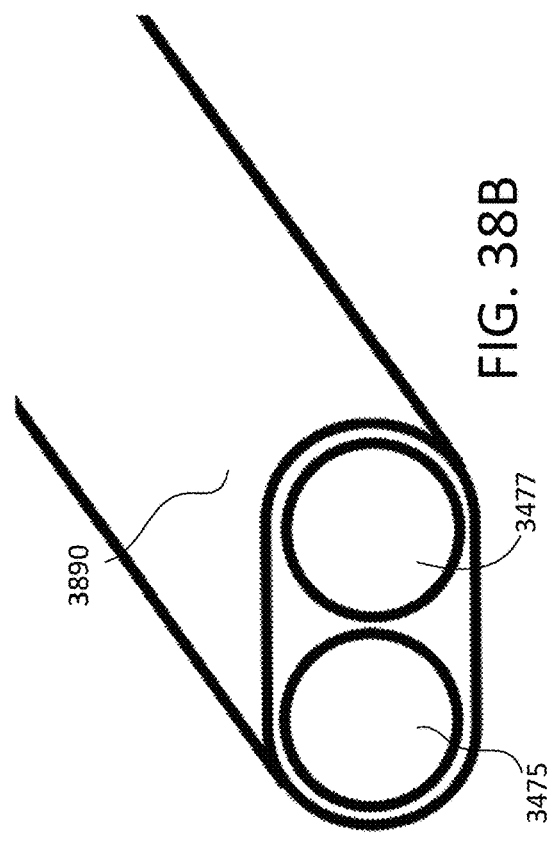
FIG. 38B shows a cross-sectional view of the insulated wrap and ducts shown in FIG. 38A.
Figure 39:
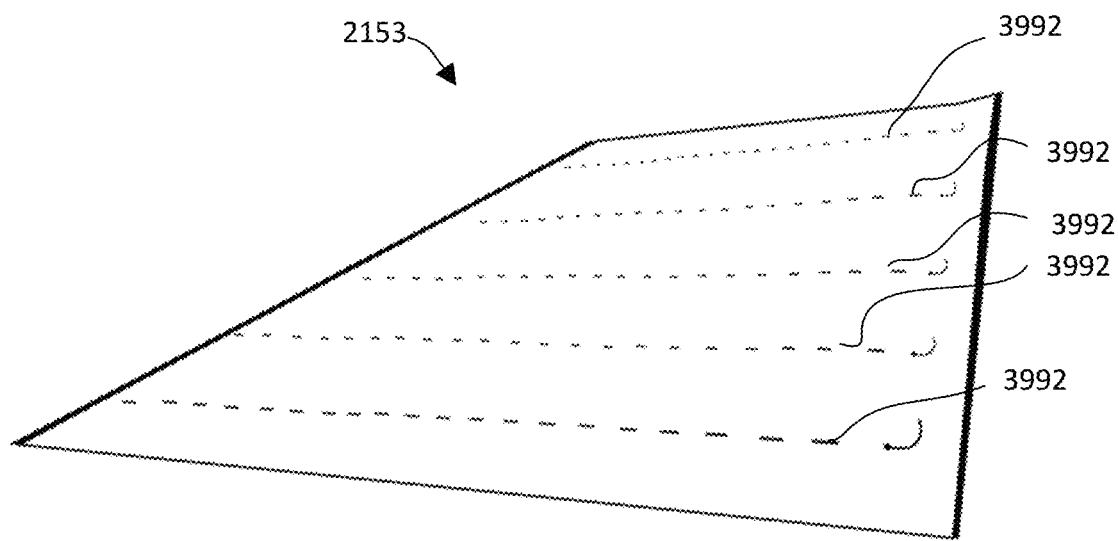
FIG. 39 shows an exemplary embodiment of an inner liner for the transportable shelter of FIG. 1 having support line assemblies.

Referring to FIGS. 38A and 38B, in certain embodiments, the supply ducts 3475 and return ducts 3477 are covered by an insulated wrap 3890. The insulated wrap 3890 can be, for example, an outer material combined with an inner insulation material. The outer material can be, for example, coated PVC, laminated PVC, nylon, polyester, etc. The insulation material can be, for example, insulation batting, high loft insulation, flexible or rigid insulation, bubble wrap, etc. Referring to FIG. 38A, the supply ducts 3475 and return ducts 3477 can be covered by the insulated wrap 3890 from the connection point with the transportable shelters 100, through the air distribution block 3493, and to the environmental control unit 3479. The insulated wrap 3890 is advantageous because it improves the energy efficiency between the environmental control unit 3479 and the transportable shelters 100. The insulated wrap 3890 is advantageous because it creates a still air cavity surrounding the supply and return ducts 3475, 3477, which adds to the energy efficiency of the shelter and the environmental control unit by allowing for thermal transfer between the ducts 3475, 3477. That is, assuming significant temperature differentials between the shelter 100, the environmental control unit 3479, ducting 3475, 3477, and the outside ambient temperature, the insulated wrap 3890 will insulate and help homogenize the system temperatures. In certain embodiments, the plastic outer material of the insulated wrap 3890 can be reversible such that a user can cause the insulated wrap to correspond to the color of the transportable shelter.

Referring to FIGS. 39 through 42, in certain embodiments, the inner liner 2153 of the transportable shelter 100 may include support line assemblies 3992 for holding one or more components (e.g., power/electrical wiring, electrical outlet drops, communication lines, lighting systems, air distribution systems, map boards, military support equipment, personal space divider walls, etc.) disposed within the interior of the transportable shelter 100. The support line assemblies 3992 are bonded to the inner liner 2153 such that the support line assemblies 3992 are omni-directional (i.e., loads can be applied to the support lines from any direction within the transportable shelter 100).

Figure 40:
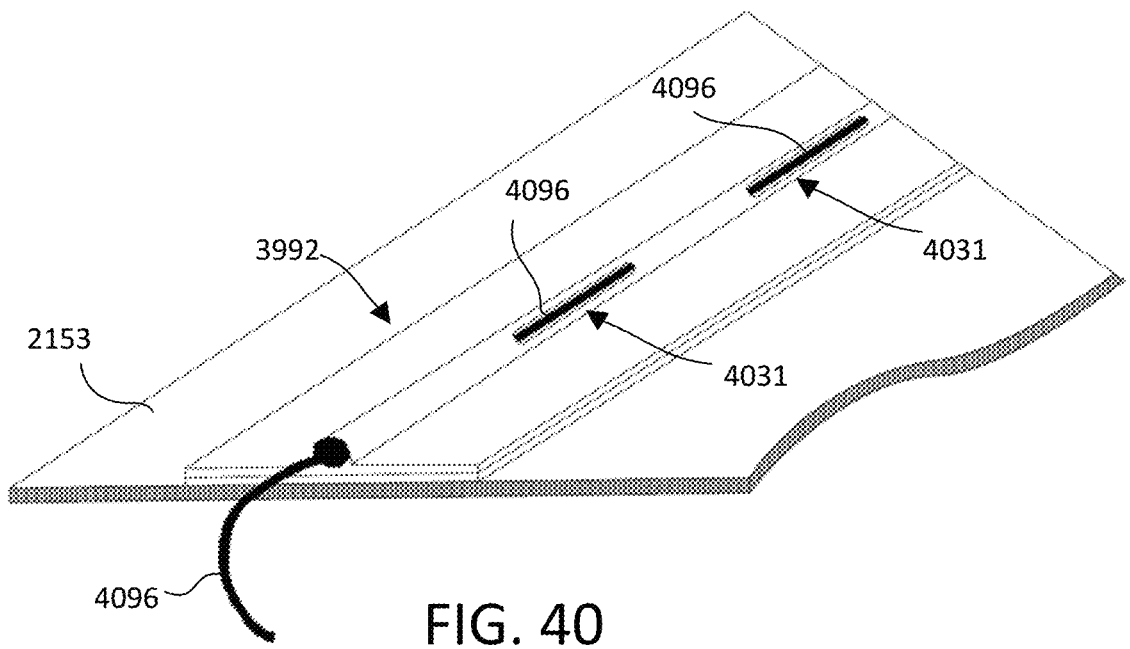
FIG. 40 shows a partial, cross-sectional perspective view of the inner liner of FIG. 39.

Referring to FIG. 40, the support line assemblies 3992 may have a support line 4096 that is accessible through one or more spaced-apart openings 4031 such that a user can hang or connect one or more components to the support line 4096. The support lines 4096 can be, for example, wire rope, metal cable line, fabric rope, cord, or any other suitable material that is capable of holding components within the transportable shelter 100.

Figure 41:
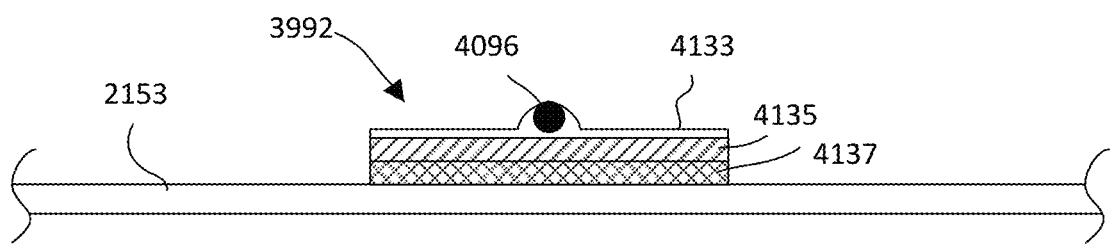
FIG. 41 shows a cross-sectional view of the inner liner of FIG. 39.

Referring to FIG. 41, the support line assemblies 3992 may include a top or upper layer 4133 that is attached to a middle layer 4135 with the support line 4096 is disposed between the upper layer 4133 and the middle layer 4135 such that the upper layer 4133 and the middle layer 4135 encapsulate the support line 4096. The upper layer 4133 may be attached to the middle layer 4133 by, for example, hot-air welding, high-frequency welding, or ultra-sonic welding, hot-wedge welding, etc. The upper layer 4133 can be, for example, a woven or knitted scrim constructed of polyester or nylon and coated or laminated to PVC. The middle layer 4133 can be, for example, a woven or knitted scrim constructed of polyester or nylon and coated or laminated to PVC. The support line assemblies 3992 also have a bottom layer 4137 that is attached to the middle layer 4133 by, for example, hot-air welding, high-frequency welding, or ultrasonic welding, hot-wedge welding, etc. The bottom layer 4137 can be, for example, a woven or knitted scrim constructed of polyester or nylon and coated or laminated to PVC. The support line assemblies 3992 can then be attached to the inner liner 2153 by attaching the bottom layer 4137 to the inner liner 2153. The bottom layer 4137 can attach to the inner liner 2153 by, for example, an overlap weld, a surface weld, a butt weld, a prayer seam, other suitable seams, or any other type of suitable connection. The connection between the layers 4133, 4135, 4137 of the support line assemblies 3992 provide support to the support line 4096 such that loads can be applied to the support lines from any direction within the transportable shelter.

Figure 42:
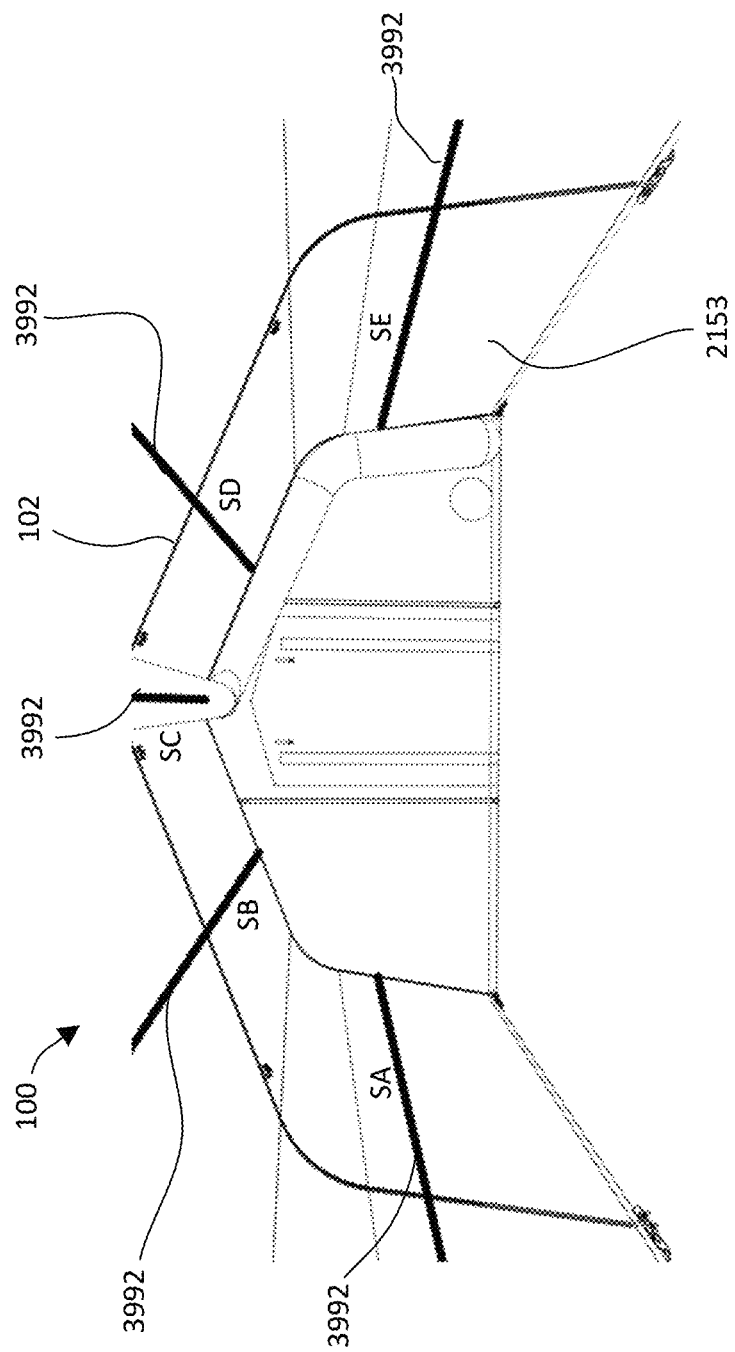
FIG. 42 shows the inner panel of FIG. 38 attached to the frame of FIG. 2.

Referring to FIG. 42, the support line assemblies 3992 may be attached to the interior surface of the liner 2153, and the liner 2153 may be attached to the frame 102 of the transportable shelter 100 such that the support line assemblies 3992 are positioned to hold the one or more components disposed within the transportable shelter. For example, at positions SA and SE, the support lines 3992 may be positioned to hold one or more electrical power connections. At positions SB and SD, the support lines 3992 may be positioned to hold lighting or illumination connections. At point SC, the support lines may be positioned to hold an air distribution system, which is advantageous to optimize internal head room for users within the transportable shelter because the air distribution system is typically a large component.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions, even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated.

While various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A transportable shelter, comprising:
 a frame having a plurality of interconnecting members that are connected to create a fixed structural element, at least one end structural element comprising a first end structural element, and a plurality of purlin portions, wherein the plurality of purlin portions attach the fixed structural element to the first end structural element, wherein the fixed structural element comprises a first inner track and a first outer track, and wherein the first end structural element comprises a second inner track and a second outer track;
 an inner liner having liner connection elements for attaching to the first inner track of the fixed structural element and the second inner track of the first end structural element;
 an outer panel having panel connection elements for attaching to the first outer track of the fixed structural element and the second outer track of the first end structural element; and
 an insulated flooring assembly connected to the at least one end structural element and the fixed structural element, wherein the insulated flooring assembly comprises a plurality of interconnecting flooring panels, each flooring panel comprising an upper surface member and an insulation material;
 wherein a dead-air space exists between the inner liner and the outer panel when the frame is assembled and the inner liner and the outer panel are connected to both the fixed structural element and the first end structural element.

2. The transportable shelter according to claim 1, further comprising a plurality of tensioning mechanisms attached to the first end structural element and the plurality of purlin portions, wherein a first tensioning mechanism of the plurality of tensioning mechanisms comprises a fastener for engaging a first purlin portion of the plurality of purlin portions to move the first end structural element away from the fixed structural element to tension the inner liner and the outer panel and create the dead-air space.

3. The transportable shelter according to claim 2, wherein the fastener of the tensioning mechanism comprises an acme bolt.

4. The transportable shelter according to claim 1, wherein the frame further comprises at least two end base members for attaching the first end structural element to a ground surface and at least two fixed base members for attaching the fixed structural element to the ground surface.

5. The transportable shelter according to claim 4, wherein each of the end base members comprises a tensioning mechanism having a fastener for engaging the first end structural element to move the first end structural element away from the fixed structural element to tension the inner liner and the outer panel to create the dead-air space.

6. The transportable shelter according to claim 1, wherein each of the liner connection elements comprise a keder cord for connecting to the first and second inner tracks, and wherein each of the panel connection elements comprise a keder cord for connecting to the first and second outer tracks.

7. The transportable shelter according to claim 1, wherein a first side of the outer panel comprises a first color and a second side of the outer panel comprises a second color, and wherein the panel connection elements can be attached to the first and second outer tracks such that the first side is facing an exterior of the transportable shelter or the second side is facing the exterior of the transportable shelter.

8. The transportable shelter according to claim 1, wherein an exterior facing side of the inner liner comprises a reflective radiant barrier for preventing UV rays from entering the transportable shelter.

9. The transportable shelter according to claim 1, further comprising a solar shade fly for attaching to the frame that promotes convective cooling of the transportable shelter.

10. The transportable shelter according to claim 1, wherein the purlin portions are sized to engage the inner liner and the outer panel such that a plurality of convective cavities exists within the dead-air space.

11. The transportable shelter according to claim 10, further comprising a plurality of insulated structural cables that are disposed within the plurality of convective cavities and engaging the inner liner and the outer panel to create a plurality of convective areas within each of the convective cavities.

12. The transportable shelter according to claim 11, wherein a pair of the plurality of insulated structural cables create an X-brace, and the X-brace is disposed in a first convective cavity of the plurality of convective cavities.

13. The transportable shelter according to claim 1, wherein a first flooring panel of the plurality of interconnecting flooring panels attaches to a second flooring panel of the plurality of interconnecting flooring panels by a tongue and groove connection.

14. The transportable shelter according to claim 1, further comprising:
a second inner liner having second liner connection elements;
a second outer panel having second panel connection elements;
wherein the at least one end structural element comprises a second end structural element that is connected to the fixed structural element by a plurality of second purlin portions, wherein the second end structural element comprises a third inner track and a third outer track, and wherein the fixed structural comprises a fourth inner track and a fourth outer track;
wherein the second liner connection elements attach to the third inner track of the second end structural element and the fourth inner track of the fixed structural element;
wherein the second panel connection elements attach to the third outer track of the second end structural element and the fourth outer track of the fixed structural element; and
wherein a second dead-air space exists between the second inner liner and the second outer panel when the frame is assembled and the second inner liner and the second outer panel are connected to both the fixed structural element and the second end structural element.

15. The transportable shelter according to claim 14, further comprising a plurality of second tensioning mechanisms attached to the second end structural element and the plurality of second purlin portions, wherein a second tensioning mechanism of the plurality of second tensioning mechanisms comprises a second fastener for engaging a second purlin portion of the plurality of second purlin portions to move the second end structural element away from the fixed structural element to tension the second inner liner and the second outer panel and create the second dead-air space.

16. The transportable shelter according to claim 1, wherein the fixed end structural element is disposed at an end of the transportable shelter.

17. The transportable shelter according to claim 1, wherein each interconnecting member of the frame has a length of 90 inches or less.

18. A transportable shelter, comprising:
a frame having a plurality of interconnecting members that are connected to create a fixed structural element, at least one end structural element comprising a first end structural element, and a plurality of purlin portions, wherein the plurality of purlin portions attach the fixed structural element to the first end structural element, wherein the fixed structural element comprises a first outer track, and wherein the first end structural element comprises a second outer track; and
an outer panel having panel connection elements for attaching to the first outer track of the fixed structural element and the second outer track of the first end structural element, the outer panel comprising a first side having a first color and a second side having a second color, wherein the first color of the first side of the outer panel has a tan color and the second color of the second side of the outer panel has a green color, and wherein the panel connection elements can be attached to the first and second outer tracks such that the first side is facing an exterior of the transportable shelter or the second side is facing the exterior of the transportable shelter.

19. The transportable shelter according to claim 18, wherein each of the panel connection elements comprise a keder cord for connecting to the first and second outer tracks.

20. The transportable shelter according to claim 18, further comprising an inner liner having liner connection elements for attaching to a first inner track of the fixed structural element and a second inner track of the first end structural element, wherein a dead-air space exists between the inner liner and the outer panel when the frame is assembled and the inner liner and the outer panel are connected to both the fixed structural element and the first end structural element.

21. The transportable shelter according to claim 20, wherein an exterior facing side of the inner liner comprises a reflective radiant barrier for preventing UV rays from entering the transportable shelter.

22. The transportable shelter according to claim 18, further comprising:
a second outer panel having second panel connection elements;
wherein the at least one end structural element comprises a second end structural element that is connected to the fixed structural element by a plurality of second purlin portions, wherein the second end structural element comprises a third outer track, and wherein the fixed structural comprises a fourth outer track;
wherein the second panel connection elements attach to the third outer track of the second end structural element and the fourth outer track of the fixed structural element; and
wherein the second outer panel comprises a first side having the first color and a second side having the second color, and wherein the second panel connection elements can be attached to the third and fourth outer tracks such that the first side is facing an exterior of the transportable shelter or the second side is facing the exterior of the transportable shelter.

23. A transportable shelter, comprising:
a frame having a plurality of interconnecting members that are connected to create a fixed structural element, at least one end structural element comprising a first end structural element, and a plurality of purlin portions, wherein the plurality of purlin portions attach the fixed structural element to the first end structural element, wherein the fixed structural element comprises a first inner track and a first outer track, and wherein the first end structural element comprises a second inner track and a second outer track;
an inner liner having liner connection elements for attaching to the first inner track of the fixed structural element and the second inner track of the first end structural element;

an outer panel having panel connection elements for attaching to the first outer track of the fixed structural element and the second outer track of the first end structural element; and a solar shade fly for attaching to the frame that promotes convective cooling of the transportable shelter;

wherein a dead-air space exists between the inner liner and the outer panel when the frame is assembled and the inner liner and the outer panel are connected to both the fixed structural element and the first end structural element.

24. The transportable shelter according to claim 23, further comprising a plurality of tensioning mechanisms attached to the first end structural element and the plurality of purlin portions, wherein a first tensioning mechanism of the plurality of tensioning mechanisms comprises a fastener for engaging a first purlin portion of the plurality of purlin portions to move the first end structural element away from the fixed structural element to tension the inner liner and the outer panel and create the dead-air space.

25. The transportable shelter according to claim 23, wherein the frame further comprises at least two end base members for attaching the first end structural element to a ground surface and at least two fixed base members for attaching the fixed structural element to the ground surface, wherein each of the end base members comprises a tensioning mechanism having a fastener for engaging the first end structural element to move the first end structural element away from the fixed structural element to tension the inner liner and the outer panel to create the dead-air space.

26. The transportable shelter according to claim 23, wherein a first side of the outer panel comprises a first color and a second side of the outer panel comprises a second color, and wherein the panel connection elements can be attached to the first and second outer tracks such that the first side is facing an exterior of the transportable shelter or the second side is facing the exterior of the transportable shelter.

27. The transportable shelter according to claim 23, wherein the purlin portions are sized to engage the inner liner and the outer panel such that a plurality of convective cavities exists within the dead-air space.

28. The transportable shelter according to claim 27, further comprising a plurality of insulated structural cables that are disposed within the plurality of convective cavities and engaging the inner liner and the outer panel to create a plurality of convective areas within each of the convective cavities.

29. The transportable shelter according to claim 28, wherein a pair of the plurality of insulated structural cables create an X-brace, and the X-brace is disposed in a first convective cavity of the plurality of convective cavities.

* * * * *